United States Patent
Allard

(10) Patent No.: US 6,551,023 B2
(45) Date of Patent: Apr. 22, 2003

(54) SOFT BODIED HIGH CAPACITY CATCH BASIN FILTRATION SYSTEM

(75) Inventor: Douglas Paul Allard, Santa Rosa, CA (US)

(73) Assignee: KriStar Enterprises, Inc., Santa Rosa, CA (US)

(*) Notice: Subject to any disclaimer, the term of this patent is extended or adjusted under 35 U.S.C. 154(b) by 0 days.

(21) Appl. No.: 09/870,549

(22) Filed: May 30, 2001

(65) Prior Publication Data

US 2002/0021939 A1 Feb. 21, 2002

Related U.S. Application Data

(63) Continuation-in-part of application No. 09/384,832, filed on Aug. 27, 1999, now abandoned.

(51) Int. Cl.[7] .............................................. E01C 11/22
(52) U.S. Cl. ............................ 405/36; 404/4; 405/43; 210/163; 210/164
(58) Field of Search ................... 404/2, 4, 5; 405/38, 405/36, 43, 50, 46, 39; 210/164, 165, 163

(56) References Cited

U.S. PATENT DOCUMENTS

| 705,447 A | 7/1902 | Sargent |
| 809,201 A | 1/1906 | Lutz |
| 1,507,531 A | 9/1924 | Vaudell |
| 2,432,203 A | 12/1947 | Miller ............................ 182/2 |
| 2,496,757 A | 2/1950 | Sieling ........................ 210/162 |
| 2,497,577 A | 2/1950 | Biggerstaff ................... 182/31 |
| 3,042,210 A | 7/1962 | Hattori ........................ 210/163 |
| 4,174,183 A | 11/1979 | Ferns ............................ 404/26 |
| 4,419,232 A | 12/1983 | Arntyr et al. ................ 210/164 |
| 4,594,157 A | 6/1986 | McGowan ................... 210/163 |
| 5,062,735 A | 11/1991 | Gaudin .......................... 404/25 |
| 5,066,165 A | 11/1991 | Wofford et al. .............. 405/119 |

(List continued on next page.)

FOREIGN PATENT DOCUMENTS

NZ 299114 8/1996

*Primary Examiner*—Thomas B. Will
*Assistant Examiner*—Alexandra K. Pechhold
(74) *Attorney, Agent, or Firm*—Howrey Simon Arnold & White, LLP

(57) ABSTRACT

A catch basin filtration system, comprising a filter body, dimensioned to fit within a drain inlet forming a trough or reservoir obstructing at least a portion of the inlet. The filter body is supported by a filter body support dimensioned to cooperatively engage with the interior walls of the inlet and with the filter body to substantially maintain the filter body in a pre-selected shape and position within the inlet. One or more connectors removably connect the filter body to the filter body support.

17 Claims, 20 Drawing Sheets

U.S. PATENT DOCUMENTS

| | | | |
|---|---|---|---|
| 5,232,587 A | 8/1993 | Hegemier et al. | 210/162 |
| 5,297,895 A | 3/1994 | Johnson | 405/41 |
| 5,345,741 A | 9/1994 | Slater | 52/646 |
| 5,360,284 A | 11/1994 | Allard | 404/2 |
| 5,372,714 A | 12/1994 | Logue, Jr. | 210/164 |
| 5,403,474 A | 4/1995 | Emery | 210/163 |
| 5,405,539 A | 4/1995 | Schneider | 210/747 |
| 5,480,254 A | 1/1996 | Autry | 404/2 |
| 5,498,331 A | 3/1996 | Monteith | 210/170 |
| 5,575,925 A | 11/1996 | Logue, Jr. | 210/747 |
| 5,632,888 A | 5/1997 | Chinn et al. | 210/163 |
| 5,632,889 A | 5/1997 | Tharp | 210/165 |
| 5,702,595 A | 12/1997 | Mossburg, Jr. | 210/163 |
| 5,720,574 A | 2/1998 | Barella | 405/52 |
| 5,733,445 A | 3/1998 | Fanelli | 210/164 |
| 5,820,762 A | 10/1998 | Bamer et al. | 210/661 |
| 5,843,306 A | 12/1998 | Singleton | 210/163 |
| 5,916,436 A | 6/1999 | Devore | 210/163 |
| 5,935,450 A | 8/1999 | Benedict | 210/776 |
| 5,958,226 A | 9/1999 | Fleischmann | 210/165 |
| 5,980,740 A | 11/1999 | Harms | 210/162 |
| 5,985,157 A | 11/1999 | Leckner et al. | 210/747 |
| 6,010,622 A | 1/2000 | Chinn et al. | 210/164 |
| 6,045,691 A | 4/2000 | McDermott | 210/164 |
| 6,059,964 A | 5/2000 | Strawser, Sr. | 210/164 |
| 6,059,966 A | 5/2000 | Brandhofer et al. | 210/232 |
| 6,080,307 A | 6/2000 | Morris et al. | 210/163 |
| 6,086,758 A | 7/2000 | Schilling et al. | 210/164 |
| 6,093,314 A | 7/2000 | Wilson et al. | 210/99 |
| 6,095,718 A | 8/2000 | Bohnhoff | 405/52 |
| 6,106,706 A | 8/2000 | Roy et al. | 210/99 |
| 6,106,707 A | 8/2000 | Morris et al. | 210/163 |
| 6,149,803 A | 11/2000 | DiLoreto, Jr. et al. | 210/164 |
| 6,214,216 B1 | 4/2001 | Isaacson | 210/162 |

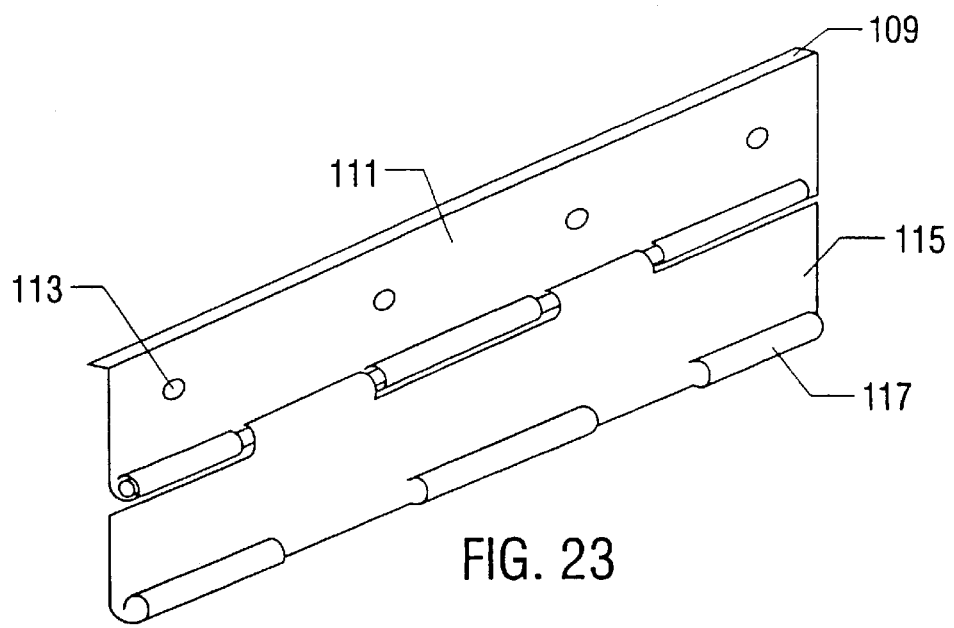
FIG. 23
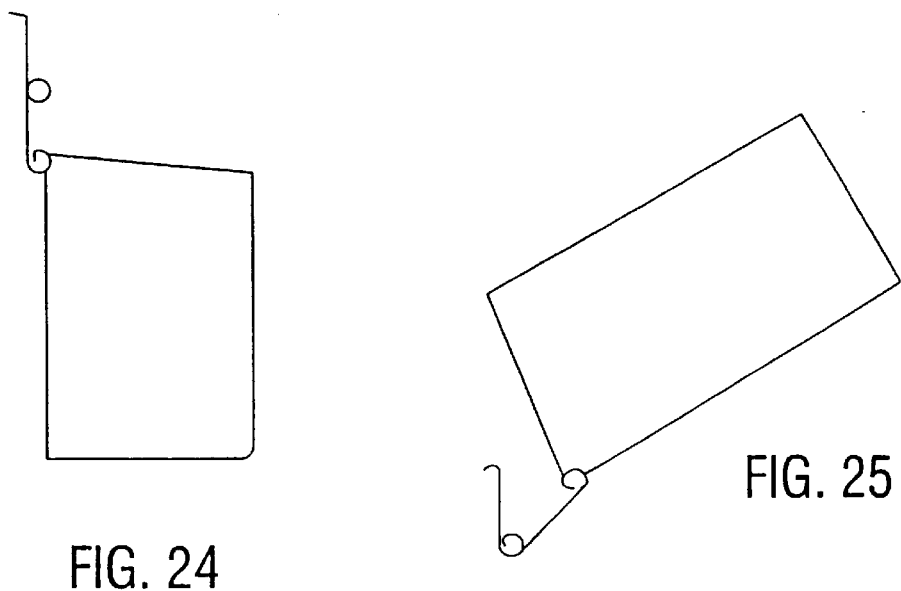
FIG. 24
FIG. 25

SOFT BODIED HIGH CAPACITY CATCH BASIN FILTRATION SYSTEM

This application is a continuation-in-part of U.S. application Ser. No. 09/384,832 filed on Aug. 27, 1999 now abandoned.

FIELD OF THE INVENTION

The present invention relates generally to systems for filtering storm water run-off and specifically to drain inlets and structures for use in drain inlets to inhibit the flow of pollutants, debris and other contaminants into drainage systems.

BACKGROUND OF THE INVENTION

Drainage systems for receiving fluid flow are well known in the art. Such systems provide a path for fluid flow from surface areas and often transport the fluid from surface areas directly to the ocean, rivers, lakes, estuaries, streams and the like without regard to the removal of debris, pollutants or other contaminants. For example, because of the Federal Environmental Protection Agency's Clean Water Act, controlling pollution from storm water runoff is receiving ever-increasing attention at all levels of government, Federal, State and local. Federal and state agencies have issued mandates and developed guidelines regarding the prevention of non-point source (storm water caused) pollution that require local governments to act upon or initiate.

Because of the aforementioned mandates, many cities and special districts have developed plans and taken action to prevent storm water pollution. These actions range from those that are educational in nature (labeling storm water inlets with phrases such as "No dumping—Flows into Rivers and Streams") to active measures to remove pollutants. Such measures generally require the installation of equipment for removing contaminants somewhere between where the storm water enters the drainage system and the ultimate body of water receiving the runoff.

Several types of equipment are employed to reduce pollution and contaminants from storm water runoff. Catch basin filtration systems use devices installed at the point that the storm water enters the drainage system. The water flow is directed through an installed adsorbent material that aids in removing contaminants from the storm water while allowing the water to flow into the drainage system. Such a permanently installed catch basin filtration system is disclosed in U.S. Pat. No. 5,720,574. In addition to catch basin filtration systems, oil/water separators are employed. Such systems generally comprise large underground holding tanks that allow silt and pollutants to settle to the bottom of the tank and the water to flow into the drainage system. Other systems also exist to remove contaminants from water runoff. However, these systems are also generally permanent installations that are expensive to install and maintain.

As various maintainable catch basin filtration systems for filtering storm water runoff have been developed additional problems have evolved. An initial problem involves the installation of these systems in the wide variety of drain inlets and catch basins that currently exist. Drain inlets and catch basins have wide variances in dimensions, particularly in overall volume and distance across the mouth of the opening. Accordingly, fixed-dimension filtration systems are thus unable to account for variances in catch basin dimensions. Accordingly, catch basin filtration systems having varying dimensions are desired.

Moreover, because such filtration systems typically require regular maintenance, issues arise such as ease of access and the length of time that a system can operate between cleaning or replacing filter elements or other parts. Access to elements that must be cleaned or replaced is problematic in some systems, such that a heightened burden is placed on those who regularly maintain these systems. In addition, silt, sediment and other debris tend to settle on or around filter elements in many filtration systems, such that the length of time that these elements can effectively filter storm water runoff is significantly reduced. Therefore, catch basin filtration systems having improved accessibility for maintained parts and longer periods of effectively filtering storm water runoff before requiring maintenance are desired.

Another significant problem that has emerged in the development of catch basin filtration systems is the ability of such systems to process large quantities of fluid during peak flow periods without having backups or stoppages that result in localized flooding of surrounding areas. Peak flow periods would include, for example, extreme storm conditions or other flood type conditions. Due to concerns over storm drainage backups that can result in localized flooding, many filtration systems employ some form of a high-flow bypass feature that allows excess fluids to proceed through the drainage system without being filtered during periods of high fluid flow. As a result, these types of filtration systems have an upper limit for the amount of fluid that can be filtered at any given time as well as a maximum capacity for the amount of fluid that can be passed through the system in any event.

In practice, many catch basin filtration systems have proven to be inferior in one or both of these areas, with the result being that the filtering of storm water runoff is inadequate and/or that these systems become backed up and flood the surrounding local area. As some filtration systems have attempted to overcome these problems by increasing the volume of the fluid retaining trough or reservoir in the filtration system, these systems have encountered problems in maintaining the shape of the reservoir during periods of high flow. In these filtration systems, the reservoir tends to expand under the increased weight of the contained fluid, such that the expanded reservoir can fill the entire inner catch basin and partially or wholly block the high flow bypass and other fluid routes. This then results in a backed up drainage system and localized flooding. Accordingly, catch basin filtration systems having increased flow capacity for both filtered flows and high flow bypass flows are desired. In addition, it is desired that the fluid retaining reservoir in such systems substantially retain its overall shape during periods of high flow such that unwanted blockages and flooding are avoided.

In addition, the high flow bypass in many current filtration systems is effectively unable to restrain large objects or "floatables," such as cigarette butts, during high flow periods. These objects typically pass through the filtration and drainage systems unimpeded whenever the high flow bypass is utilized in these systems. Accordingly, catch basin filtration systems that inhibit or restrain large objects or floatables from passing through high flow bypass areas are desired.

SUMMARY OF THE INVENTION

The present invention is directed to a disposable or re-useable catch basin filtration system that is effective and economical to install and maintain. Generally, the apparatus comprises a filter body dimensioned to fit within an inlet and forming a trough obstructing at least a portion of the inlet. The filter body is supported by a filter body support dimensioned to cooperatively engage with the inlet and the filter body to substantially maintain the filter body in a preselected shape and position with the inlet. One or more connectors removably connect the filter body to the filter body support.

In one embodiment, the filter structure comprises a filter body made of a tough, permeable material, such as a woven geotextile material. The filter body forms a trough that is supported in a drain inlet by a supporting structure, such as a steel frame, to maintain the filter body in the desired shape for receiving fluid flow entering the drain inlet. The filter body allows fluid, such as water runoff, to pass through while inhibiting the flow of debris and sedimentation contained in the runoff through the filter body. In addition, one or more adsorbent containers can be placed in the filter body to remove pollutants or contaminants from fluid flowing through the filter body. For example, the adsorbent containers, such as a permeable pouch, may contain adsorbents for removing hydrocarbons from fluid flowing through the filter body.

In another embodiment, the filter body is supported in the inlet and forms a trough around the perimeter of the inside wall of the inlet. The interior wall of the trough forms a dam that is lower than the outer wall of the trough. Adsorbent pouches can be preferably removably attached, such as by velcro, to the outer wall and the dam of the trough. During periods of fluid flow, such as storm water runoff, the fluid flows into the inlet and enters the filter body. As the level of the water rises in the filter body, it causes the adsorbent pouches to float. As the pouches float, the fluid is exposed to the adsorbent thereby allowing contaminants to be removed from the fluid. When fluid completely fills the filter body, the fluid flows over the dam and into the drainage system.

One feature of the present invention is the ability to easily remove the filter body, the adsorbent pouch, or both, from the inlet. This provides the advantage of easily servicing the filtration system by removing the filter body or adsorbent pouches for cleaning or replacement.

In another embodiment, the catch basin filtration system is adapted to accommodate increased fluid-flow capacities. This embodiment provides increased filtered and bypass flow capacities, a substantially maintained shape of the fluid retaining reservoir, a means to retain floatables during periods of high flow, an adjustable supporting structure, and more readily maintainable components having longer periods of effective operation. This high capacity embodiment comprises a filter body defining a reservoir that is situated within a support basket having large apertures through its walls. This support basket may comprise a netting or geogrid, and is attached to and suspended from a support frame. Support cables combine with the support basket and an adjustable frame to form a filter body support. The filter body is connected to and substantially lines the walls and floor of the support basket. The filter body and frame are spaced apart and serve as an adjustable high flow bypass. Adsorbent containers in the form of elongated booms are removably suspended from the filter body walls in strategic configurations. A debris trap capable of retaining floatables and large debris during periods of high flow extends into the filtration system and rests atop the frame. In addition, stiffening and flow diverting baffles are attached or sewn into the filter body walls to assist in retaining floatables and large debris as well as to provide support to the filter body.

One feature of the present invention is the ability to accommodate basin openings of various dimensions. In a particularly preferred embodiment, various sizes of the support frame, which comprises a rigid inner support ring, support flanges and closure flanges, are employed to accommodate openings of various sizes. For example, the inner support ring can be of any pre-determined size. The size of the accompanying support basket, filter body and adsorbent pouches are dimensioned according to the inner support ring. The flanges come in pieces or sections, and can be easily assembled to attach to the inner support ring. Another feature of the present invention is a support system that permits a larger volume of fluid to be retained and processed by the system. In particularly preferred embodiment, support cables traverse the corners and cross the bottom of the support basket and function to hold the basket corners together, as well as to substantially prevent the support basket from bulging or expanding under the load imposed by the fluid and sediment held in the filter body.

Another feature of this embodiment is the adjustable high flow bypass, which exists at exposed large apertures of the support basket that are above the upper edge of the filter body and below the lower edge of the support frame. The walls of the filter body are held in place against the walls of the support basket, and the placement level of the upper edge of the filter body against the support basket may be raised or lowered, thereby respectively raising or lowering the high flow bypass capacity. Adsorbent booms are suspended within the filter body such that these booms float or otherwise become displaced as the filter body fills with fluid, which prevents the buildup of silt or sedimentation on the booms.

BRIEF DESCRIPTION OF THE DRAWINGS

FIG. 23 is a perspective view illustrating one embodiment of a filter body mounting bracket.

FIG. 24 is a side view of the mounting bracket illustrated in FIG. 23.

FIG. 25 is a side view of the mounting bracket of FIGS. 23 and 24 illustrating the operation of the mounting bracket.

DETAILED DESCRIPTION OF THE INVENTION

The present invention relates to drain inlets adapted to receive fluid flow or runoff. Such inlets take a variety of forms, for example curb openings, inlets or drains; drop inlets, combination inlets (e.g., curb inlets combined with drop inlets) and the like. Absent a barrier, fluid will flow unimpeded into the inlet and through the drainage system. Such drainage systems generally empty into a variety of geological formations such as bays, estuaries, rivers, lakes, or underground aquifers. The present invention is directed to a filter assembly that is easily cleaned and reused or easily removed and disposed of as circumstances warrant.

Generally, the present invention comprises a filter body supported by a filter body support. Generally the filter body support will comprise a frame from which the filter body is suspended. The frame is configured to support the filter body in the desired shape and position. In addition, the frame is configured to cooperatively engage with an inlet to hold the filter body in the correct position relative to the inlet. The filter body support also includes any other filter body supporting structures such as brackets and the like that aid in maintaining the filter body in the desired shape and position.

Figure 1:
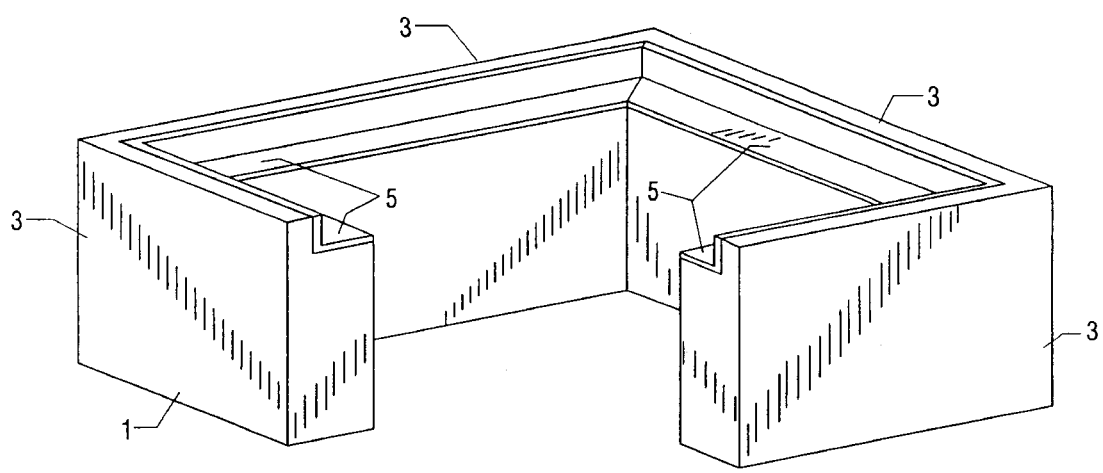
FIG. 1 is a cut-away perspective view of a grate inlet structure.

Referring to FIG. 1, a grate inlet structure 1 is illustrated having sides 3 and upper load bearing surfaces 5. Generally, the grate inlet structure is composed of concrete and situated below the surface such that the top portions of the sides are approximately even with the surface level, for example with a road surface, pavement or the like. A grate (not shown) will typically be situated in the inlet and rest on the load bearing surfaces 5.

Figure 2:
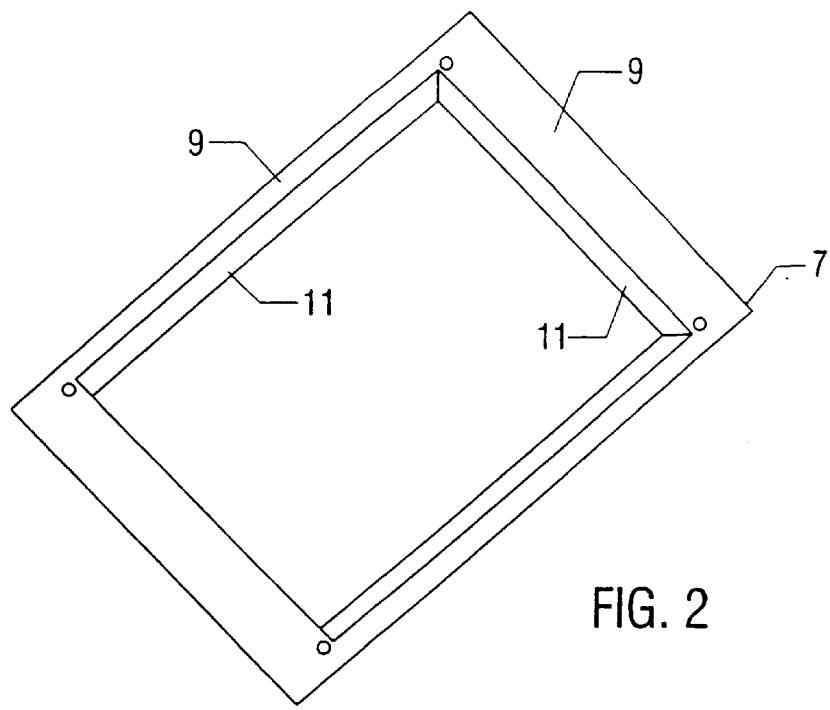
FIG. 2 is a top perspective view of one embodiment of a frame structure of the present invention.
Figure 3:
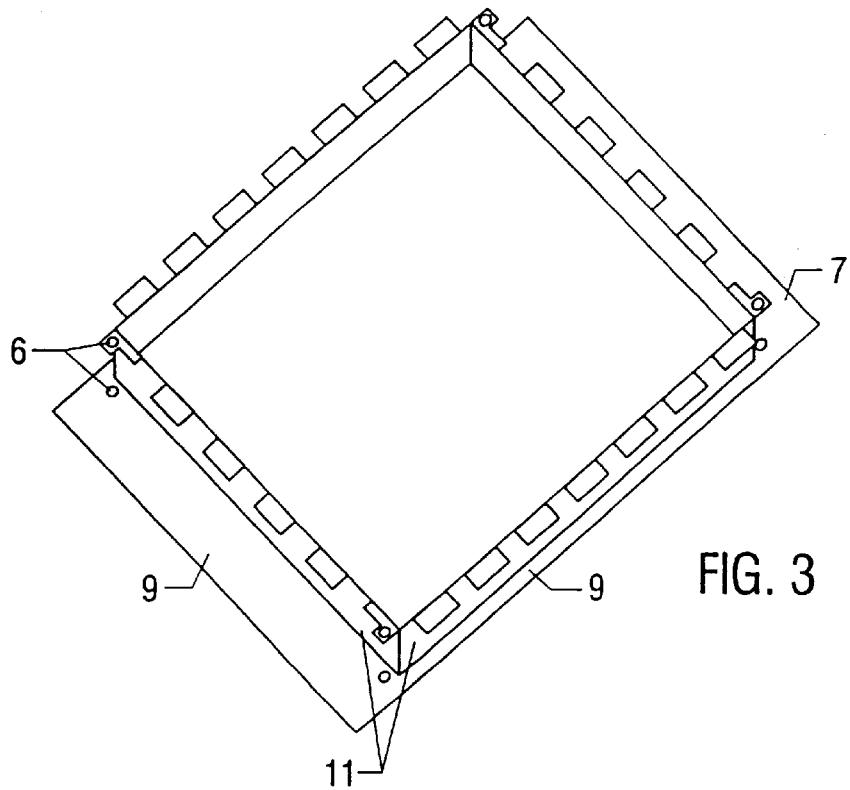
FIG. 3 is a bottom perspective view of the frame structure illustrated in FIG. 2.

Referring to FIGS. 2 and 3, a frame according to one embodiment of the present invention is illustrated. FIG. 2 shows a top perspective view of frame 7 and FIG. 3 shows a bottom perspective view of frame 7. Frame 7 is illustrated having a flange 9 extending perpendicularly from frame wall 11. In practice, frame 7 is situated in the grate inlet structure 1 illustrated in FIG. 1 such that the flange 9 rests on upper load bearing surface 5. The grate (not shown) can then be placed into the grate inlet structure such that the grate rests on top of flange 9 to further secure the frame in place.

Figure 4:
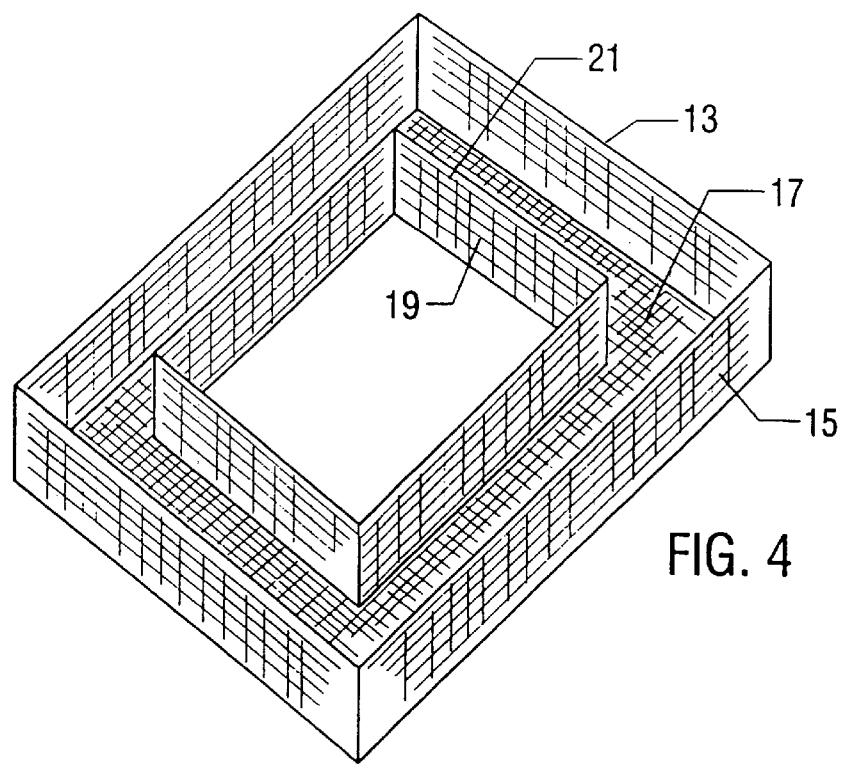
FIG. 4 is a perspective view of an illustration of one embodiment of a filter body of the present invention.

As indicated, the frame serves as at least one portion of the filter body support. Referring to FIG. 4, a filter body 13 illustrating one embodiment of the present invention is shown. As illustrated, filter body 13 comprises a filter body wall 15, filter body floor 17, dam 19 and wier 21. A variety of terms can be used to describe the general shape of the filter body, such as trough, pocket, basket, catch basin and the like.

The filter body captures and substantially retains sedimentation and debris, and so is shaped, as indicated, as a trough. The position of the filter body in the inlet depends on the particular inlet. The filter body may be adjacent the top portion of an inlet or catch basin. It may positioned adjacent a portion of the inside wall of the inlet or around the perimeter of the upper portion of the inlet where it can be maintained.

As indicated, one purpose of the filter body is to capture and substantially retain material carried by a fluid, such as sedimentation and debris carried in water run-off, while letting the fluid itself pass through. Accordingly at least a portion of the filter body is constructed of perforated or porous materials. For example, the entire filter body may comprise such perforated or porous material, or may comprise perforated material in combination with non-perforated material. The perforated or porous material may be constructed of screen, netting, or woven materials such as cloth materials. The type of material used to construct the perforated portions of the filter body may be of any suitable material strong enough for the environment in which the filter will be employed, i.e., strong enough to retain sedimentation and debris contained in fluid flow without breaking. Examples of such materials include plastic or metal screening or netting, sturdy woven materials and the like. In addition, stiffeners may be added to the filter body materials such as metal or plastic strips that can be inserted into sleeves or loops contained in the filter body, or metal or plastic strands woven directly into the filter body material. A particularly preferred material for constructing the filter body is a woven geotextile material such as GEOTEX™ 117 or 111F woven monofilament manufactured by Synthetic Industries, Chattanooga, Tenn. Another particularly preferred material for constructing the filter body is a monofilament polypropylene yarn such as Mirafi Filterweave® 401 manufactured by TC Mirafi of Pendergrass, Ga. Although the size of the perforations is not critical, the perforations should be of a size to accomplish the desired debris or sediment control. Larger openings may be incorporated into the filter body material if desired to allow for a high fluid flow bypass.

As indicated, the filter body may be entirely constructed of a perforated or porous material, or constructed of a combination of porous and non-porous materials depending on the application in which the filter body is to be employed. For example, referring to FIG. 4, the filter body wall 15 may be constructed of a non-porous material, such as a plastic material, such as a plastic film or sheet, or a combination of porous and nonporous materials. Similarly the dam 19 may be constructed of a non-porous material, or a combination of porous and non-porous materials. The filter body floor 17 will preferably be constructed of a porous material, but may include a combination of porous or nonporous materials, especially where materials are included in the filter body floor to increase the strength of the structure.

As indicated, stiffening materials may be incorporated into the filter body to add strength and to aid in maintaining the filter body in the desired shape. For example, to add strength and to aid in keeping the dam 19 in the desired shape, especially under fluid flow conditions, stiffening materials can be incorporated into the dam. Particularly preferred is the incorporation of stiffening materials along the periphery of the dam just below the weir 21. The stiffening materials may be of a variety of types, such as metal or plastic strips or rods that can be inserted into sleeves or loops located at strategic points in the filter body. For example, they may be positioned as discussed above along the periphery of the dam 19 below weir 21, or the stiffening materials may be comprised of materials that can be directly woven into the filter body material, such as a metal thread woven into the filter body material.

Figure 5:
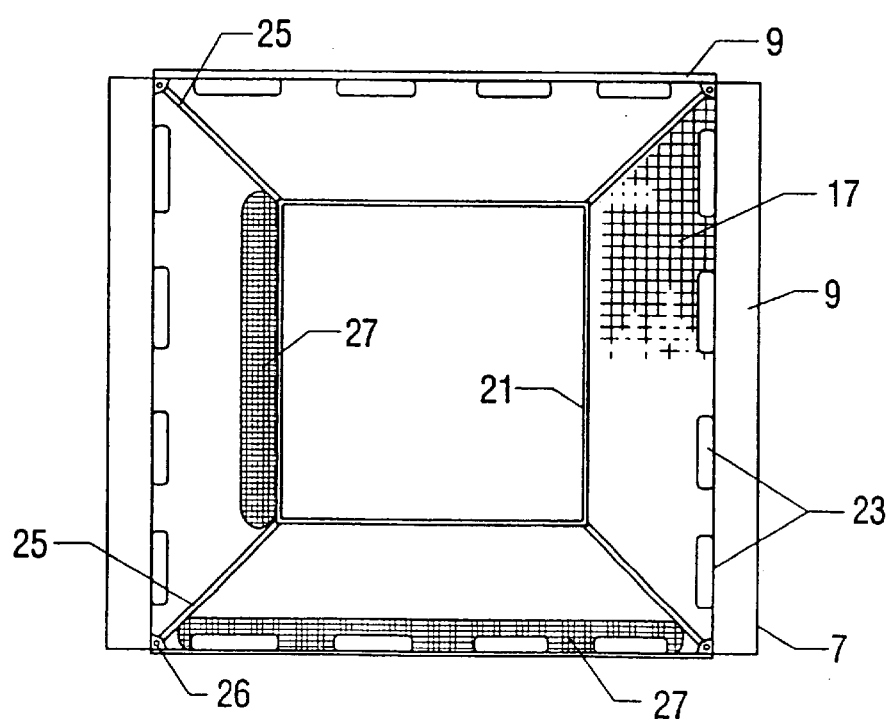
FIG. 5 is a top view of a frame and filter combination according to one embodiment of the present invention.
Figure 6:
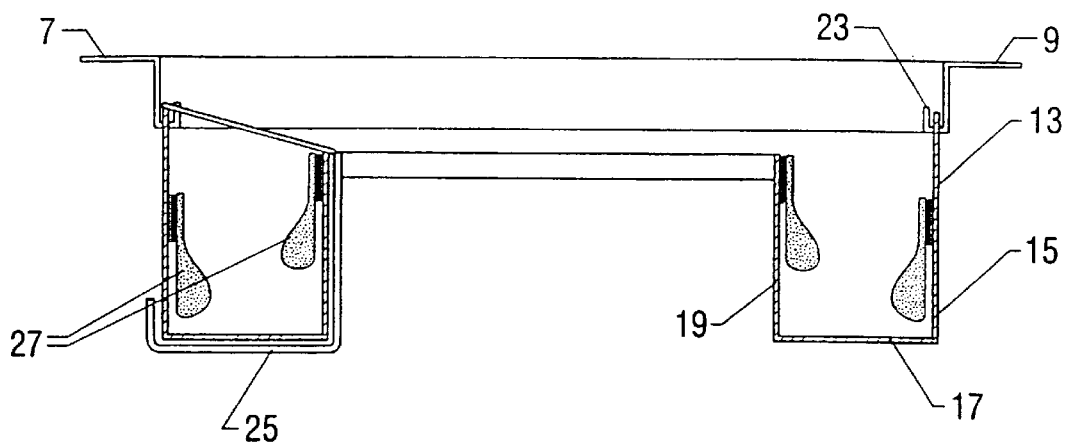
FIG. 6 is a side cut-away view of the frame and filter combination of FIG. 5.

Referring to FIGS. 5 and 6, a top and cut-away side view of one embodiment of the filter body and frame combination is illustrated. The filter body 13 is shown attached to the frame 7 using filter body attachment members 23 such as tabs, ribs, rails or the like. The attachment members 23 (here shown extending inward from the frame) can be inserted into corresponding openings, such as slits, along the upper periphery of filter body wall 15 to suspend the filter body from the frame 7. If desired, corresponding retaining members such as rods, clamps and the like can be attached to the attachment members to further secure the filter body in place. Filter body support brackets 25 are attached at the corners of the frame 7 and extend across the filter body 13, over weir 21, down the dam 19 and under the floor 17 to provide additional support to the filter body and to aid in maintaining the filter body in the desired shape. To assist in maintaining the dam in the desired shape, the bracket may be inserted through loops (not shown) positioned along the weir. The support brackets may be configured in a variety of ways. For example, the brackets may configured to completely traverse the frame to form an X shape. The filter body can then be attached to the brackets using corresponding loops or sleeves located on the filter body.

As indicated, one purpose of the frame is to support the filter body in the drain inlet. Another purpose is to aid in holding open the filter body in the desired shape. The filter body may be attached to the frame using any desirable connecting method such as snaps, screws, rivets, buttons, tabs, hooks, clamps, drawstrings and the like. Preferably, the connector or fastener employed will allow the filter body to be removably engaged with the frame such that the filter body can be replaced when necessary.

The filter body may be attached to the frame at points internal or external of the frame. For example, referring to FIG. 3, the frame 7 is shown having externally mounted attachment members 29 that allow for attachment of a corresponding filter body to the outside of the frame.

One or more adsorbent containers can be attached to the interior of the filter body. Such containers are of a permeable material, such as a net pouch, bag or the like. The adsorbent containers are filled with an adsorbent material. One example of an adsorbent material is an inert inorganic blend of amorphous siliceous material containing sodium, potassium and aluminum silicates. The adsorbent containers can be attached in a variety of ways to the interior of the filter body, such as by clips, snaps, loops, velcro and the like. In a preferred embodiment, the adsorbent containers are removably attached to the interior walls of the filter body such that as the filter body fills with fluid, the adsorbent containers float, exposing the fluid to the adsorbent material contained therein. As illustrated in FIGS. 5 and 6, adsorbent containers 27 are situated along the outer wall of the filter body, and along the interior of the dam.

Figure 7:
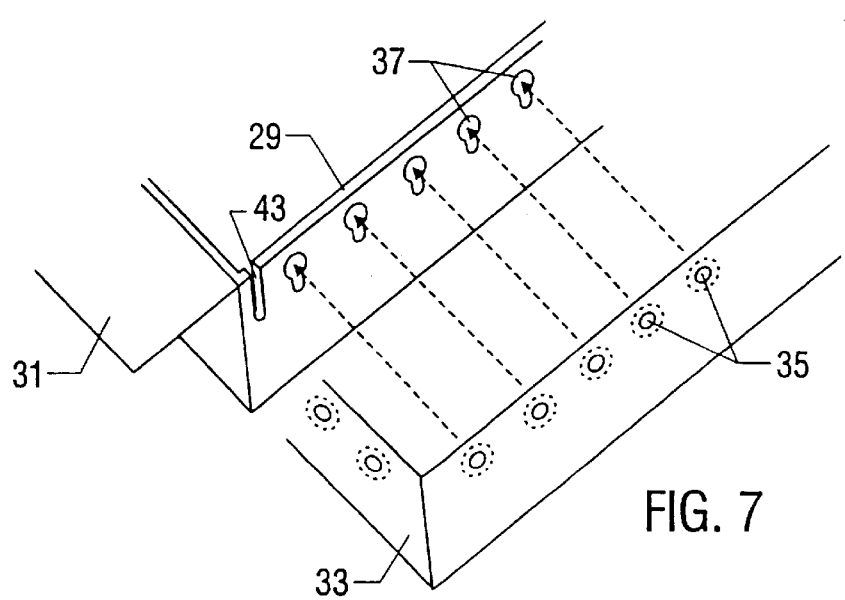
FIG. 7 is a partial perspective view illustrating one embodiment of a filter body and frame mounting system of the present invention.
Figure 8:
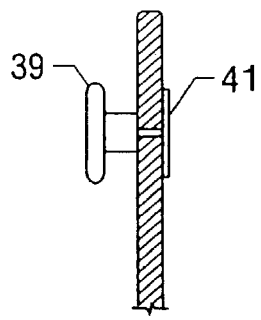
FIG. 8 is a side view of a filter body connector used in the mounting system of FIG. 7.
Figure 9:
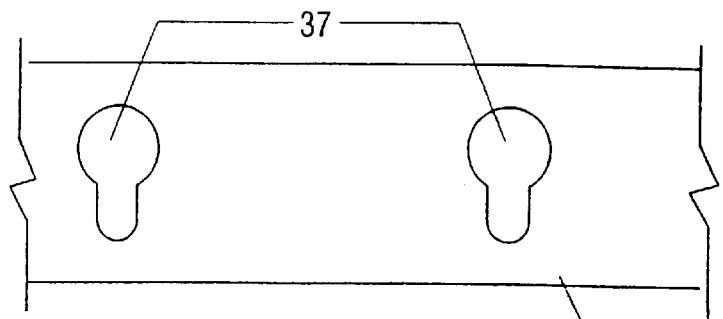
FIG. 9 is a partial side view of a frame for use in the frame mounting system of FIG. 7.
Figure 10:
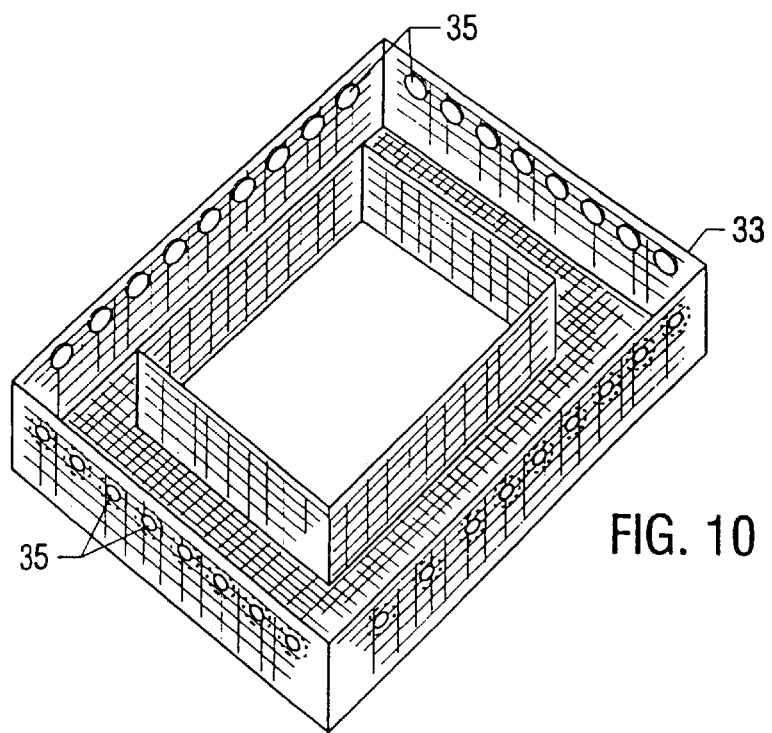
FIG. 10 is a perspective view of one embodiment of a filter body illustrating the filter body connectors of FIG. 8 along the upper periphery of the filter body.

Referring to FIGS. 7–10, an especially preferred filter body attachment method is illustrated. Frame 29 is shown having flange 30. A corresponding filter body 33 is shown having attachment members 35 situated along the periphery of the filter body. The attachment members 35 are designed to fit through corresponding openings 37 situated along the periphery of frame 29. The attachment members can be of any desired shape such that they may extend through the openings and be lodged in place. Preferred attachment members in this embodiment are fasteners such as buttons, tabs, rivets and the like that are configured for corresponding engagement with openings in the frame. Referring more particularly to FIG. 8, an attachment member is illustrated having a frame attachment portion 39 and a filter body attachment portion 41 that extends through the filter body 33 and secures the attachment member to the filter body. Referring more particularly to FIG. 9, the attachment member can then be inserted into corresponding opening 37 in frame 29. The attachment members may be configured such that the filter body is attached to the inside of the frame by, for example, reversing the orientation of the attachment member.

As indicated previously, a support bracket is preferably employed to assist in holding open the filter body in the desired position. Accordingly, a support bracket is dimensioned to cooperatively engage with the filter body to hold it open in the desired shape and to cooperatively engage with the inlet to hold the filter body in the desired position. The support bracket may take a variety of forms. It may be internal of the filter body itself, such as stiffening materials woven into the filter body, such as ribs, rods, and the like. In addition, support brackets may include male and female members slidably engaged with each other to allow adjustment for accommodating inlets, frames and filter bodies of various sizes.

As illustrated in FIG. 3, support bracket attachment points 6 are shown. As illustrated in FIG. 5, the upper end of support bracket 25 is retained in attachment point 26. As illustrated in FIG. 6, the support bracket may be retained by the filter body attachment member 23. In either case, in the embodiments illustrated, the bracket extends across the filter body, down the dam and under the filter body floor, and then extends upward such that the lower end of the bracket 25 can be wedged between the filter body and the wall of the inlet.

Figure 11:
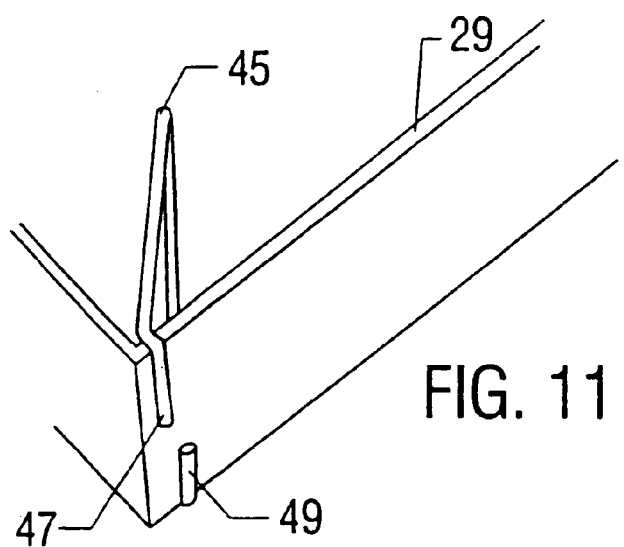
FIG. 11 is a partial perspective view of a frame and one embodiment of a filter body support bracket.

An especially preferred bracket attachment mechanism is illustrated in FIGS. 7 and 11. Referring to FIG. 7, frame 29 has bracket retaining slot 43. Referring to FIG. 11, support bracket 45 is shown having a first end 47 and a second end 49. The upper end rests in slot 43. The lower end extends upward along the outside of the frame 29 and is wedged between the frame and the inside wall of the inlet.

Figure 12:
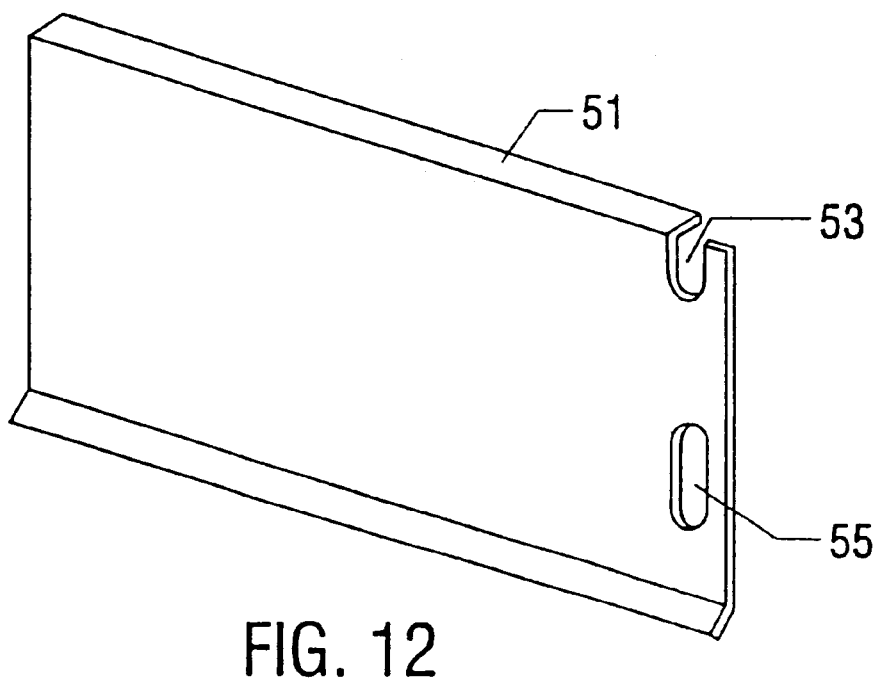
FIG. 12 is a partial perspective view of a frame having an alternative embodiment for attaching a filter body support bracket.
Figure 13:
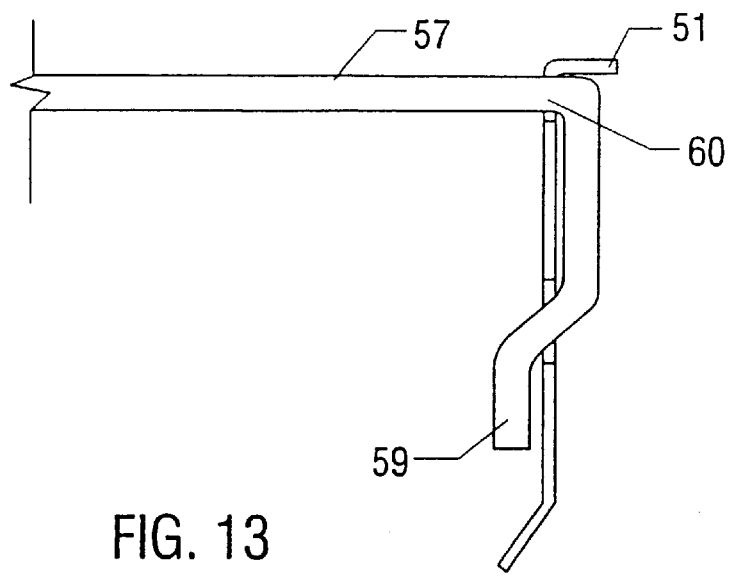
FIG. 13 is a partial side view of the frame of FIG. 12 and an alternative embodiment of a filter body support bracket mounted therein.
Figure 14:
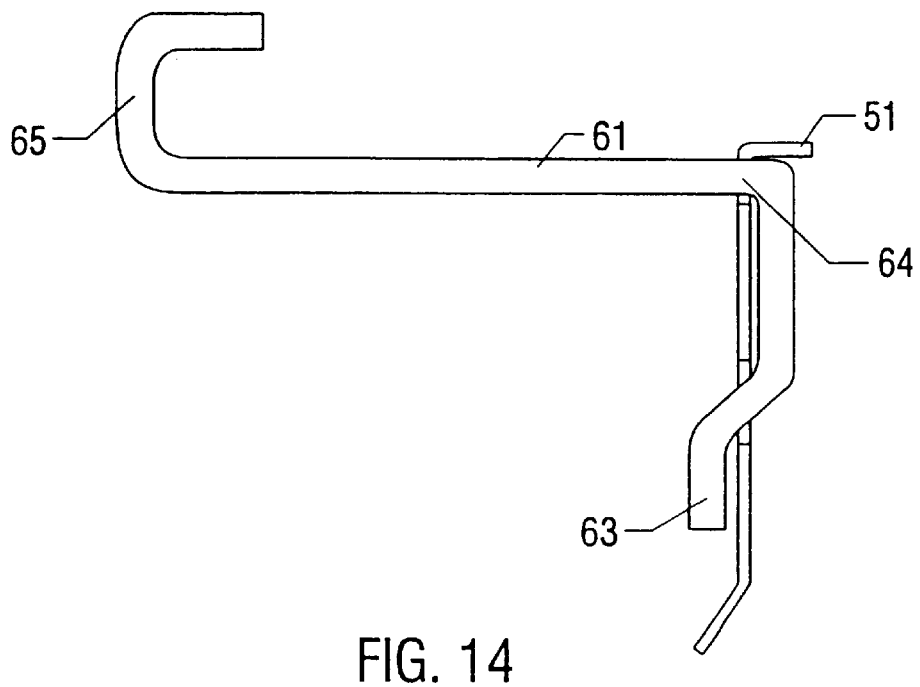
FIG. 14 is a side view of a filter body support bracket mounted in the frame illustrated in FIG. 12.

Referring to FIGS. 12–14, another preferred embodiment is illustrated for attaching a support bracket to a frame. FIG. 12 illustrates a frame 51 having a first opening 53 and a second opening 55. Referring to FIG. 13, a support bracket 57 configured to rest in corresponding openings 53 and 55 is shown wherein a first end 59 of support bracket 57 is inserted into corresponding opening 55. A support bracket mid portion 60 is then inserted into corresponding opening 53. A second end of the support bracket (not shown) may then extend across the filter body and attach to the filter body at strategic locations in order to retain the filter body in the desired shape. A particularly preferred attachment mechanism is illustrated in FIG. 14 wherein a support bracket 61 is illustrated having a first end 63 inserted into a corresponding opening in frame 51 and a support bracket mid portion 64 resting in a corresponding opening also in frame 51. An upwardly oriented second end 65 passes through a filter body attachment member (not shown), such as a loop, to assist in retaining the filter body in the desired open position.

The support bracket may be attached to the filter body at strategic attachment points, such as through a loop situated on the weir. Alternatively, the bracket may be incorporated into the filter body itself, such as sufficiently rigid material woven into the filter body to hold the body open in the desired position, or passed through sleeves in the filter body. In addition, the support brackets may include male and female members slidably engaged with each other such that the brackets can be adjusted to accommodate differences in filter body sizes and to make adjustments in the field where necessary.

Figure 15:
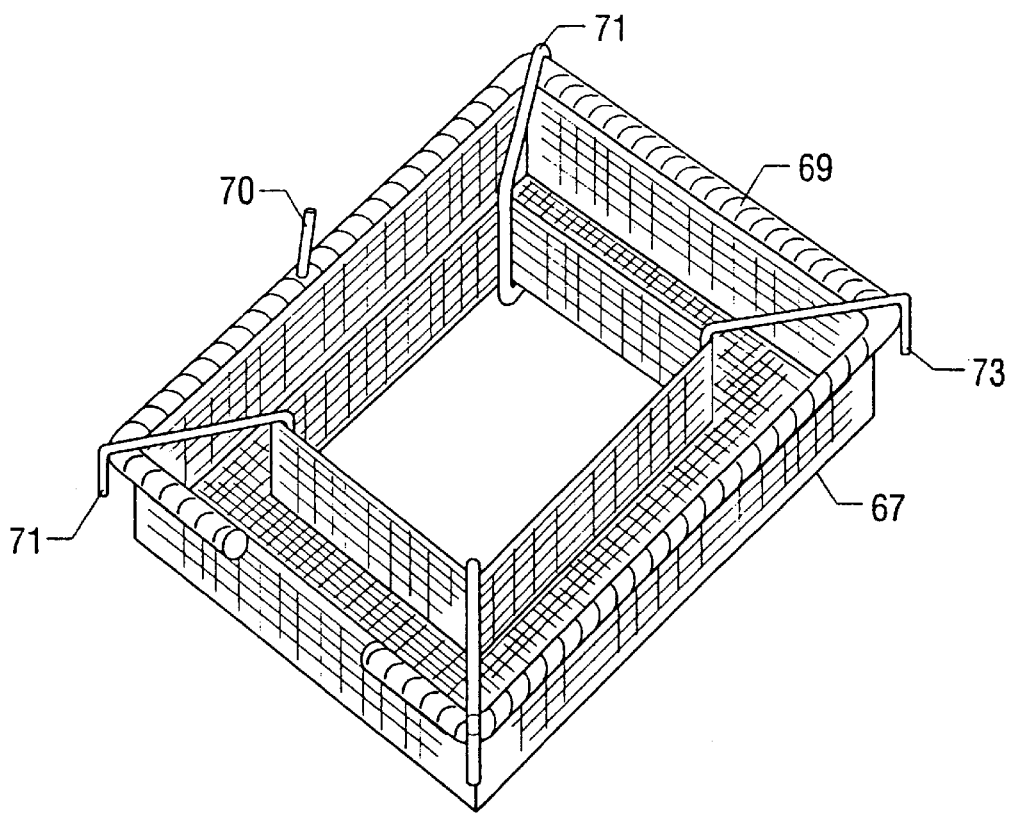
FIG. 15 is a perspective view of an alternative embodiment of a filter body illustrating the use of an inflatable bladder situated along the outer perimeter of the filter body.
Figure 16:
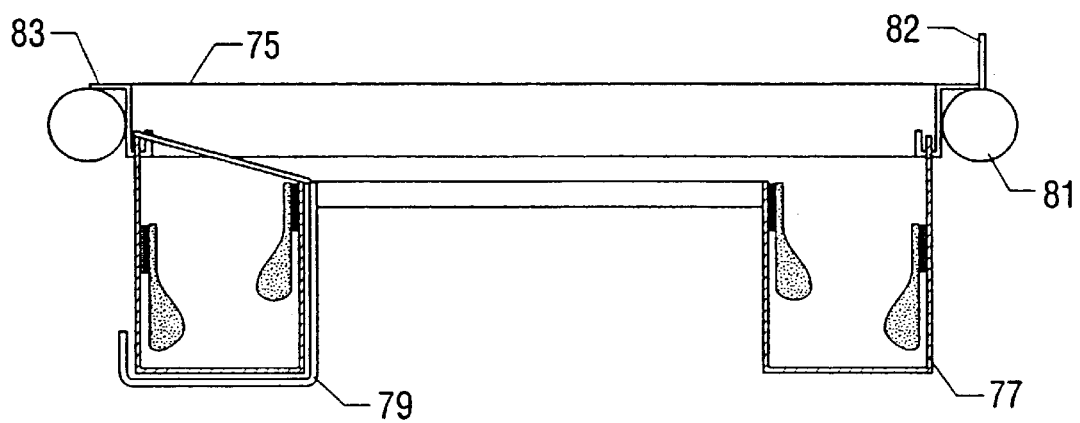
FIG. 16 is a side view of a frame and filter body combination employing an inflatable bladder situated along the outer perimeter of the frame.

In certain applications it may be desirable to position the filter body in the inlet below the load bearing surfaces (as illustrated in FIG. 1) of the inlet, or in cases where no structure exists in the inlet on which to rest the frame. Referring to FIGS. 15 and 16, an alternative embodiment is illustrated wherein an inflatable member, such as an air bladder is situated along at least a portion of the perimeter of the filter body, either inside or outside of the filter body. The filter body is positioned in the inlet in the desired location and the member inflated such that the member is urged against the inside wall of the inlet, securing the filter body in position. Referring to FIG. 15, a filter body 67 is illustrated having inflatable member 69 extending along the outside perimeter of the filter body. Corner brackets 71 are used in conjunction with the inflatable member to assist in holding the filter body in the desired open position. The inflatable member may be attached to the filter body by any suitable mechanism, such as sewn to the filter body or inserted into loops or sleeves in the filter body. In addition, the support brackets may be inserted into loops or sleeves in the filter body and inflatable member to secure the brackets in place. As discussed above, one or more ends of the support brackets may be secured in place by positioning them between the filter body and the inside wall of the inlet. For example, as illustrated in FIG. 15, end 73 may be positioned such that it extends to the outside of the filter body and the inflatable member. Inflating the member, for example through valve 70, will wedge the support bracket between the inflatable member and the inside wall of the inlet, assisting in securing the support bracket in place.

Referring to FIG. 16, an alternative embodiment is illustrated wherein the inflatable member is used in conjunction with a frame. As shown, frame 75 is combined with a filter body 77 and support brackets 79 as earlier described. An inflatable member 81 is positioned such that it extends along the outside perimeter of the frame such that flange 83 rests on top of inflatable member 81. As earlier described, the inflatable member can be inflated through valve 82 such that the inflatable member is urged against the inside wall of the inlet, thereby securing the frame and filter body in place. In addition to inflating the member with a gas, the member may be inflated with other materials such as an expandable foam material.

Figure 17:
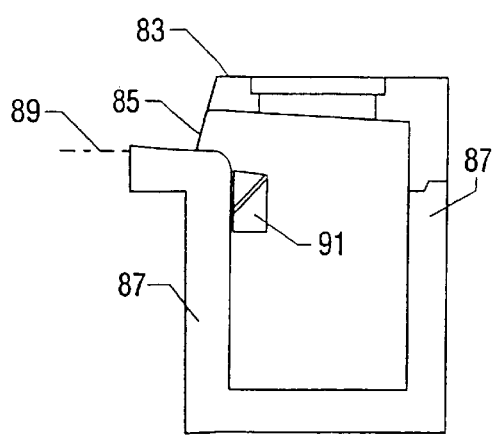
FIG. 17 is a side view of a curb inlet having an alternative embodiment of the present invention situated therein.
Figure 18:
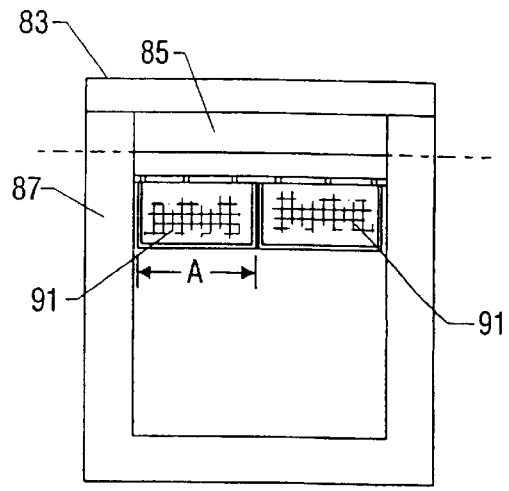
FIG. 18 is a front view of a curb inlet having an alternative embodiment of the present invention situated therein.
Figure 19:
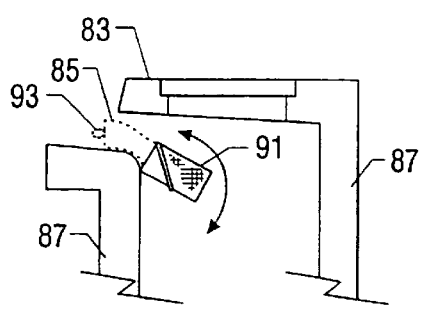
FIG. 19 is a side view illustrating the operation of the alternative embodiment illustrated in FIGS. 17 and 18.

FIGS. 17–19 illustrate another embodiment of the present invention installed in a curb inlet. A curb inlet 83 is illustrated having curb opening 85 and curb inlet wall 87. Generally, the lower portion of the opening 85 corresponds to the level of the surface 89 adjacent the curb inlet, such as pavement. One or more filter body members 91 extend along the inside surface of wall 87 adjacent the curb opening 85. At least a portion of fluid or debris flowing into opening 85, such as water run-off, will pass through one or more of the filter bodies 91 disposed in the inlet. As illustrated more particularly in FIG. 19, filter body member 91 can be rotated upwards and the filter body itself turned inside out, such as by pulling upwards on a loop 93 disposed within the filter body, in order to remove solids retained within the filter body member.

Figure 20:
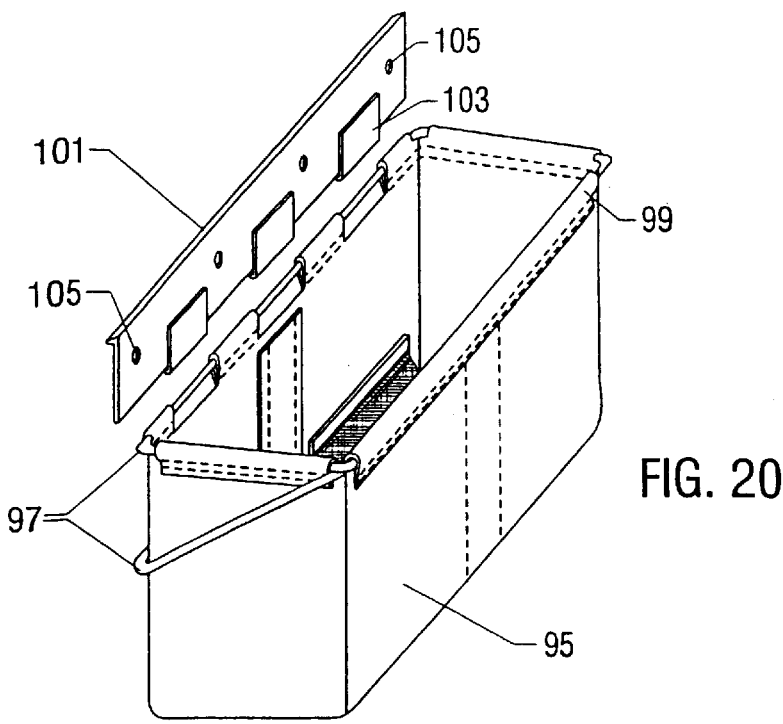
FIG. 20 is a perspective view of a frame and filter body combination illustrating an alternative embodiment of the present invention.
Figure 21:
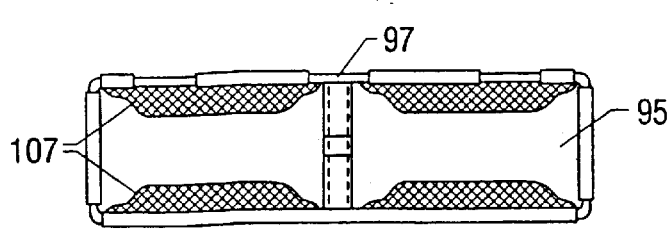
FIG. 21 is a top view of the embodiment illustrated in FIG. 20.
Figure 22:
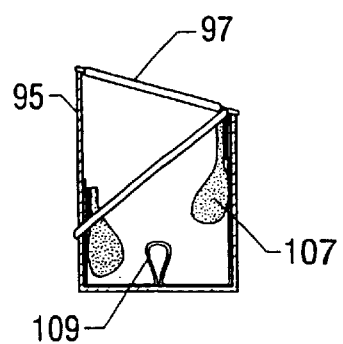
FIG. 22 is a side view of the embodiment illustrated in FIG. 20.

In general, the filter body member comprises a filter body, a frame adapted to hold the filter body in the desired position, and one or more attachment members for attaching the filter body to the frame and the frame and filter body to the inlet. FIGS. 20–22 illustrate a particularly preferred filter body member for use in a curb inlet. A filter body 95 is attached to frame 97 using sleeves 99 through which the frame is passed. A frame attachment member 101 is adapted for attaching the frame and securing the attachment member to the inside wall of a curb inlet. As illustrated, frame attachment member 101 is illustrated having frame mounting members 103 for securing the frame 97 to the frame attachment member. Openings 105 are included in the frame attachment member for anchoring the frame attachment member to the inside wall of the curb inlet. Referring more particularly to FIGS. 21 and 22, the filter body 95 includes one or more filter members 107. The filter members are designed to hold filtration media as previously described, and can comprise any suitable permeable container such as pouches, pockets and the like. A loop 109 may be incorporated into the filter body to assist in pulling the filter body member up and inside out to facilitate removal of solids, to remove and replace filter members, or to replace the filter body.

FIGS. 23–25 illustrate a particularly preferred frame attachment member. Frame attachment member 109 is shown having an upper wall mounting member 111 and openings 113 to facilitate anchoring the frame attachment member to the inside wall of a curb inlet. A lower frame mounting member 115 having frame attachment members 117 rotatably attaches the frame to the frame attachment member. Frame mounting member 115 is rotatably attached to upper wall mounting member 111. The frame attachment member acts as a double hinge, as illustrated more particularly in FIGS. 24 and 25. During cleaning or removal of the filter body, the filter body is pulled upward and rotated relative to both the lower frame mounting member 115 and the upper wall mounting member 111.

Other contemplated embodiments of the present invention are particularly preferred for accommodating increased fluid flow by maintaining the catch basin shape during periods of high fluid flow, and providing a means to retain floatables while the high-flow bypass is in use. These embodiments can also employ an adjustable supporting structure, allowing ease of maintenance and longer periods of use before requiring maintenance.

Figure 26:
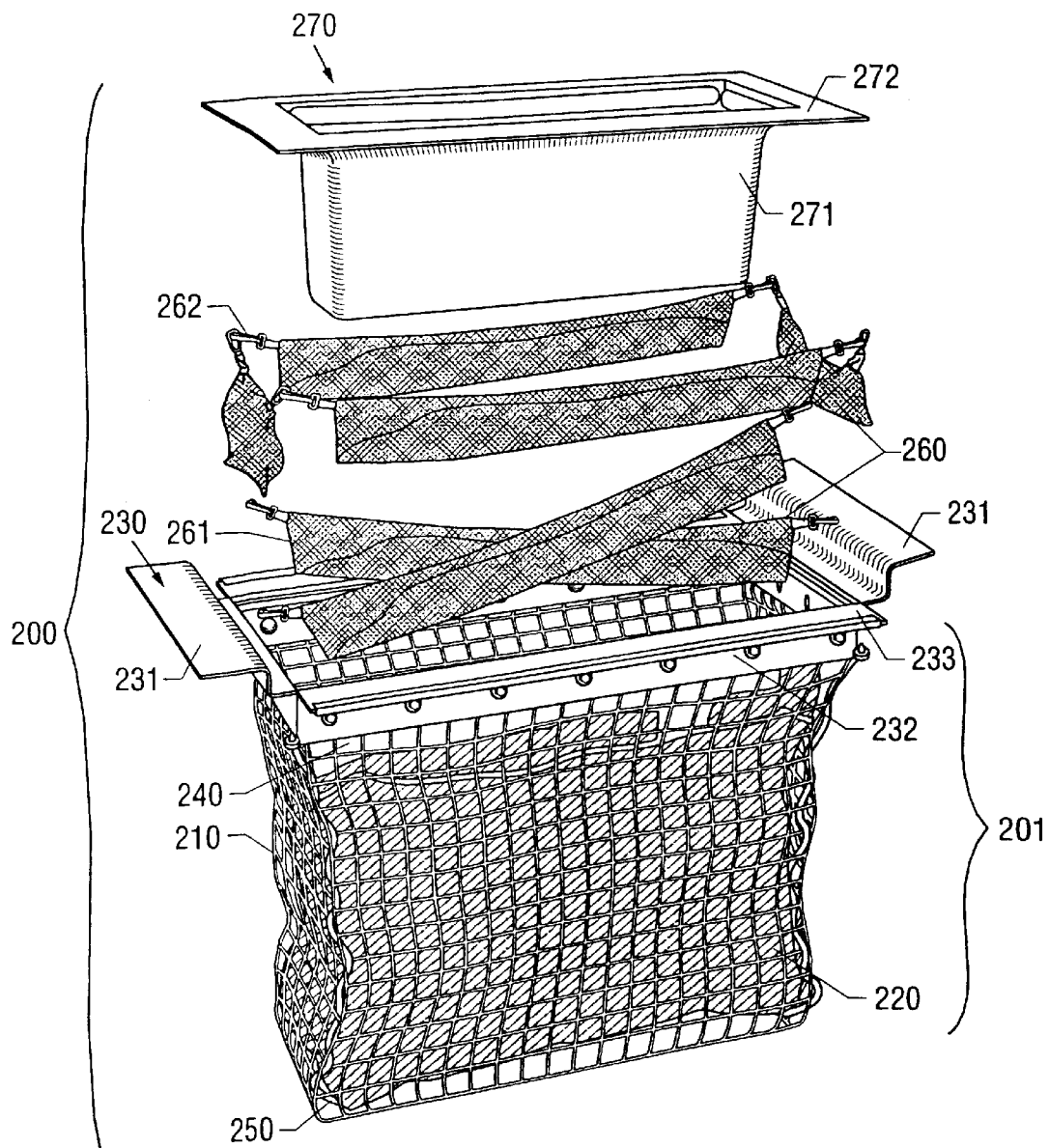
FIG. 26 is a partially exploded view of a preferred high capacity embodiment of the present invention.

Referring to FIG. 26, a partially exploded view of a high capacity catch basin filtration system according to a preferred embodiment of the present invention is illustrated. Although a four-walled generally rectangular or box-shaped filtration system is depicted, other shapes having a different number of walls or shapes, such as generally circular or oval shapes, are also contemplated. High capacity filtration system 200 generally forms a reservoir 201 for collecting and filtering fluid flow or storm water runoff. The outer walls and floor of this reservoir are formed by outer body or support basket 210, which comprises a portion of the filter body support, while the inner walls and floor of the reservoir are formed by filter body 220. Support basket 210 contains a plurality of large holes for passing fluid, and is preferably made of geogrid or other suitably strong netting. Because the support basket is preferably made of geogrid or netting that is relatively flexible in comparison with metal, hard plastic, fiberglass, and other stiffer materials, this embodiment can be referred to as a "soft body" embodiment for ease of reference.

Again referring to FIG. 26, support basket 210 is attached to and suspends from a lower portion of support frame 230, which also comprises a portion of the filter body support. As in the foregoing embodiments, support frame 230 includes one or more support flanges 231 for use in supporting the entire filtration system against a load bearing surface within an inlet structure or catch basin. Support frame 230 also includes inner support ring 232 and may include closure flanges 233. Filter body 220 is attached to and lines the walls and floor of support basket 210 in the general shape of a reservoir. The upper edge of filter body 220 is spaced apart and below frame 230, such that a high flow bypass 240 directly through support basket 210 is created between filter body 220 and support frame 230. In addition to support basket 210 and support frame 230, support cables 250 also comprise a portion of the filter body support. Support cables 250 traverse and connect the walls of support basket 210, preferably along the corners between basket walls, and also attach to support frame 230, preferably at inner support ring 232.

Adsorbent containers or booms 260 are removably attached to the interior of filter body 220 in various formations and in a variety of strategic locations. As shown in the preferred embodiment illustrated in FIG. 26, a first pair of adsorbent booms 261 are suspended from the internal walls of filter body 220 such that they traverse the floor of filter body 220 to form an X shape. In addition, a separate set of four adsorbent booms 262 are also suspended from the internal walls of filter body 220 such that each suspended boom rests against the floor and a respective wall of filter body 220. Removable debris trap 270 comprises walls 271 extending into the reservoir created by support basket 210 and filter body 220, such that large objects and floatables are retained within the debris trap whenever the water level inside the reservoir rises above the lower edge of the debris trap walls. An inner portion of support frame 230 is adapted to support flange 272 of debris trap 270, which rests loosely atop the support frame such that the entire debris trap is readily removable from the rest of filtration system. Typically, an inlet grating (not shown) will rest atop at least support frame 230 at one or more support flanges 231, and possibly atop debris trap flange 272 as well, to secure the entire filtration system in place within a drain inlet or catch basin.

Figure 27:
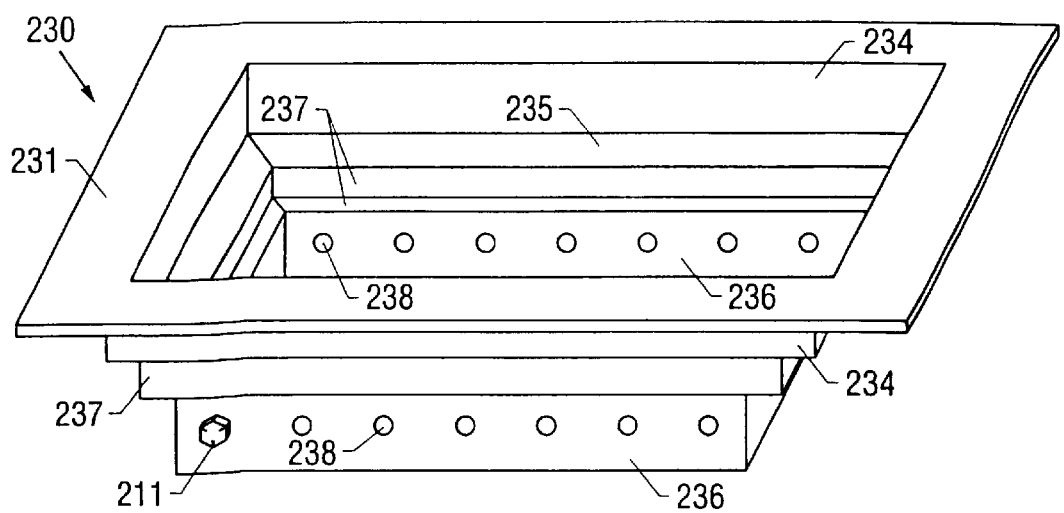
FIG. 27 is a perspective view of the support frame illustrated in FIG. 26.
Figure 28:
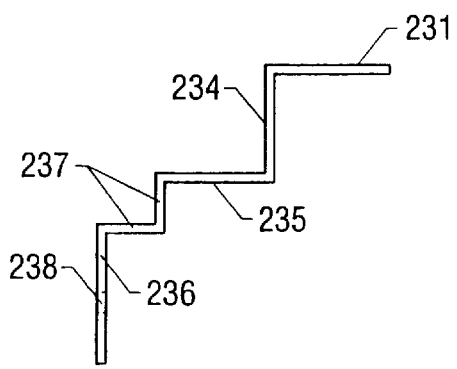
FIG. 28 is a side cross-sectional view of the support frame illustrated in FIG. 27.

Referring to FIGS. 27 and 28, one embodiment of frame 230 of the high capacity filtration system illustrated in FIG. 26 is shown. FIG. 27 shows a perspective view, while FIG. 28 shows a side cross-sectional view of support frame 230. Similar to the frame depicted in FIGS. 2 and 3, support flange 231 extends generally perpendicularly from upper frame wall 234 such that it can rest on a load bearing surface within a drain inlet (not shown) and thereby support the entire filtration system. Support surface 235 extends generally perpendicularly and inward from upper frame wall 234, and provides a load bearing surface capable of supporting the debris trap as described above. Lower frame wall 236 can extend generally perpendicularly from support surface 235, or additional generally perpendicular wall and surface segments 237 may intervene.

In addition to providing support for the debris trap at a support surface, forming the frame as shown to include multiple bends, flanges, surfaces, walls, and the like serves to stiffen and strengthen the frame such that it is more resistant to torsional forces and better able to support an increased load imposed by the reservoir. Frame 230 may be formed from, for example, 16 gauge stainless steel, a hard plastic, or any other suitable material capable of bearing the load imposed by a reservoir filled with fluid and built up sediment. Regularly spaced holes 238 are formed in lower frame wall 236 to facilitate attachment of the support basket to the support frame. As illustrated in FIG. 26, steel bolts 211 may be used to attach the support basket to the support frame at these regularly spaced holes. Any other acceptable connecting method may also be used to attach the support basket to the support frame, such as snaps, screws, rivets, buttons, tabs, hooks, clamps, drawstrings and the like. A connector that renders the support frame readily removable from the support basket is not necessary, as the support frame and support basket tend to be permanent elements of the overall filtration system that do not require regular maintenance. Accordingly, a relatively permanent connecting method such as the bolts illustrated in FIG. 26 is appropriate.

Figure 29:
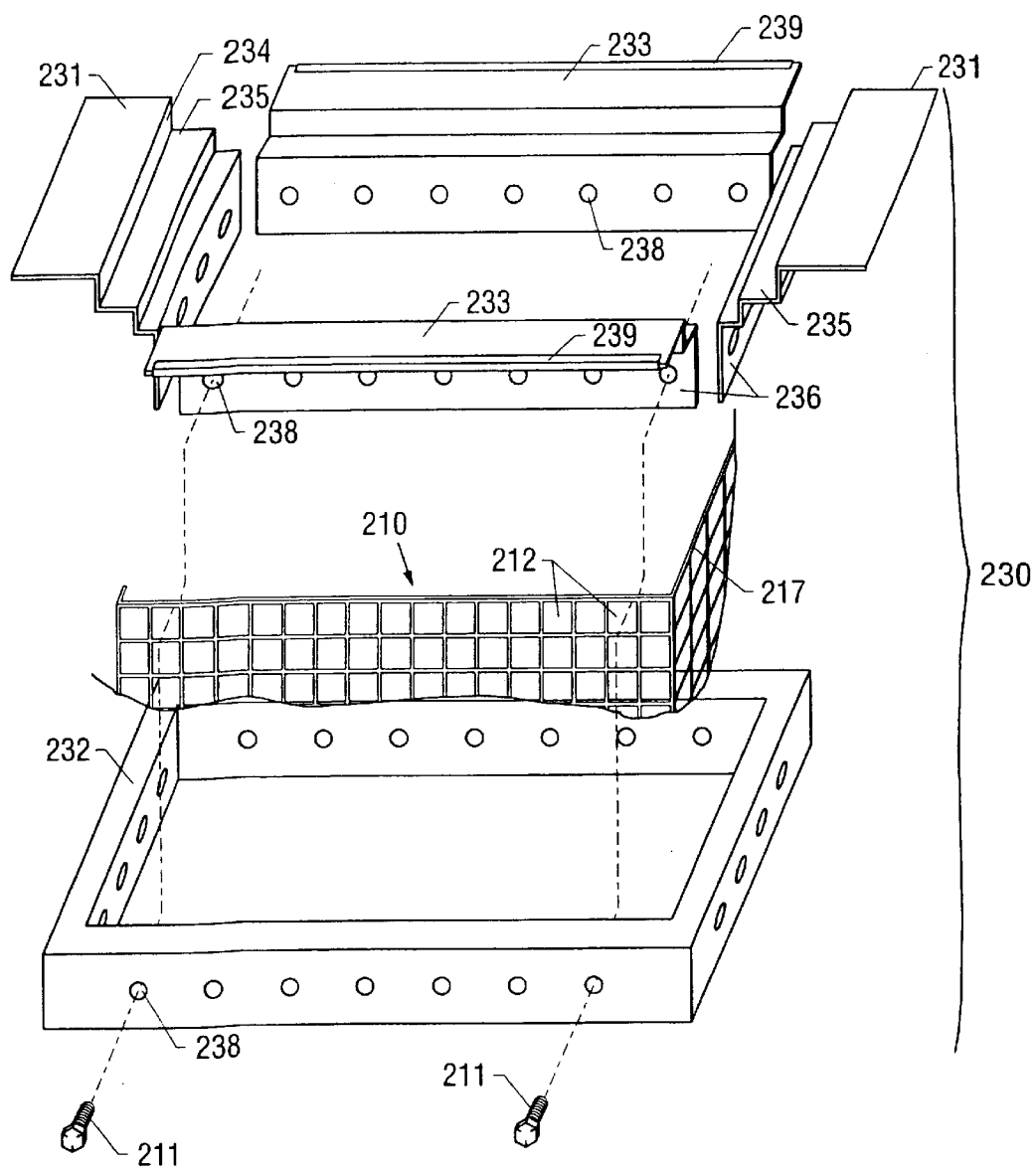
FIG. 29 is an exploded view of the support frame embodiment illustrated in FIGS. 26–28.

Referring to FIG. 29, a particularly preferred embodiment of support frame 230 of the filtration system illustrated in FIG. 26 is shown in an exploded view. A foundation for support frame 230 is established by inner support ring 232, which both supports and defines the sizes of the support basket, filter body, adsorbent pouches and support and closure flanges. Inner support ring 232 comprises four metal segments or bars, which are preferably welded together to form a singular rigid box or ring. This inner support ring may alternatively be cast or formed by any other acceptable method as is known in the art. Inner support ring 232 is sized at a dimension less than the internal diameter of the inner catch basin such that high flow bypass and filtered fluids are allowed to flow between the filtration system and the walls of the catch basin.

Inner support ring 232 preferably locates and connects to one or more flange segments. In a preferred embodiment, the inner support ring connects to two pairs of separate flanges comprising a total of four separate flange segments. A pair of support flange segments 231 attach to inner support ring 232 at opposing sides of the support ring, while an optional pair of closure flange segments 233 attach to the inner support ring at its other pair of opposing sides. Alternatively, four support flange segments may be used, with one segment attaching at each side of the inner support ring. Bolts 211 attach inner support ring 232 to each flange segment at regularly spaced holes 238 in the support ring and in the lower wall 236 of each flange segment. Each flange segment preferably attaches to the inside of the inner support ring, such that the outer wall of the inner support ring can be seen around its circumference. In addition, the support basket (not shown) is positioned between the inner support ring and each flange segment before bolting is accomplished. Other acceptable connecting methods may also be used to attach the flange segments to the inner support ring, such as snaps, screws, rivets, buttons, tabs, hooks, clamps, drawstrings and the like.

The cross-section of each support and closure flange segment is shaped similarly to the cross-section of the entire support frame in the foregoing embodiment, as illustrated in FIG. 28. Each closure flange segment 233, however, typically does not require either the support flange 231 or upper frame wall 234 sections. As in the above embodiment, support flanges 231 extend generally perpendicularly from upper frame walls 234 such that these support flanges can rest on a load bearing surface within a drain inlet and thereby support the entire filtration system. Accordingly, support flanges 231 support inner support ring 232, which in turn supports the rest of the filtration system, including closure flanges 233. Closure flanges 233 do not carry any load, and function to close any gap that exists between the outside of the filtration system and the inside walls of the catch basin. Because they serve to close any gaps and prevent fluid from avoiding the filtration system, closure flanges 233 preferably comprise gaskets 239 attached to and running along an outer edge to form a substantial seal against the catch basin wall. As in the foregoing embodiment, support surfaces 235 extend generally perpendicularly and inward from upper frame walls 234, and provide a load bearing surface capable of supporting the debris trap.

As indicated, catch basin filtration systems that are capable of accommodating the dimensions of various drain inlets and catch basins are desired. The present embodiment permits dimensional flexibility in the formation of the system. Inner support rings come in a wide variety of sizes, and may even be custom made as necessary, such that a particular inner support ring may be selected for a given drain inlet or catch basin. Flange segments of appropriate dimensions are then attached to each side of an inner support ring to comprise a support frame that will fit into the given catch basin.

Figure 30:
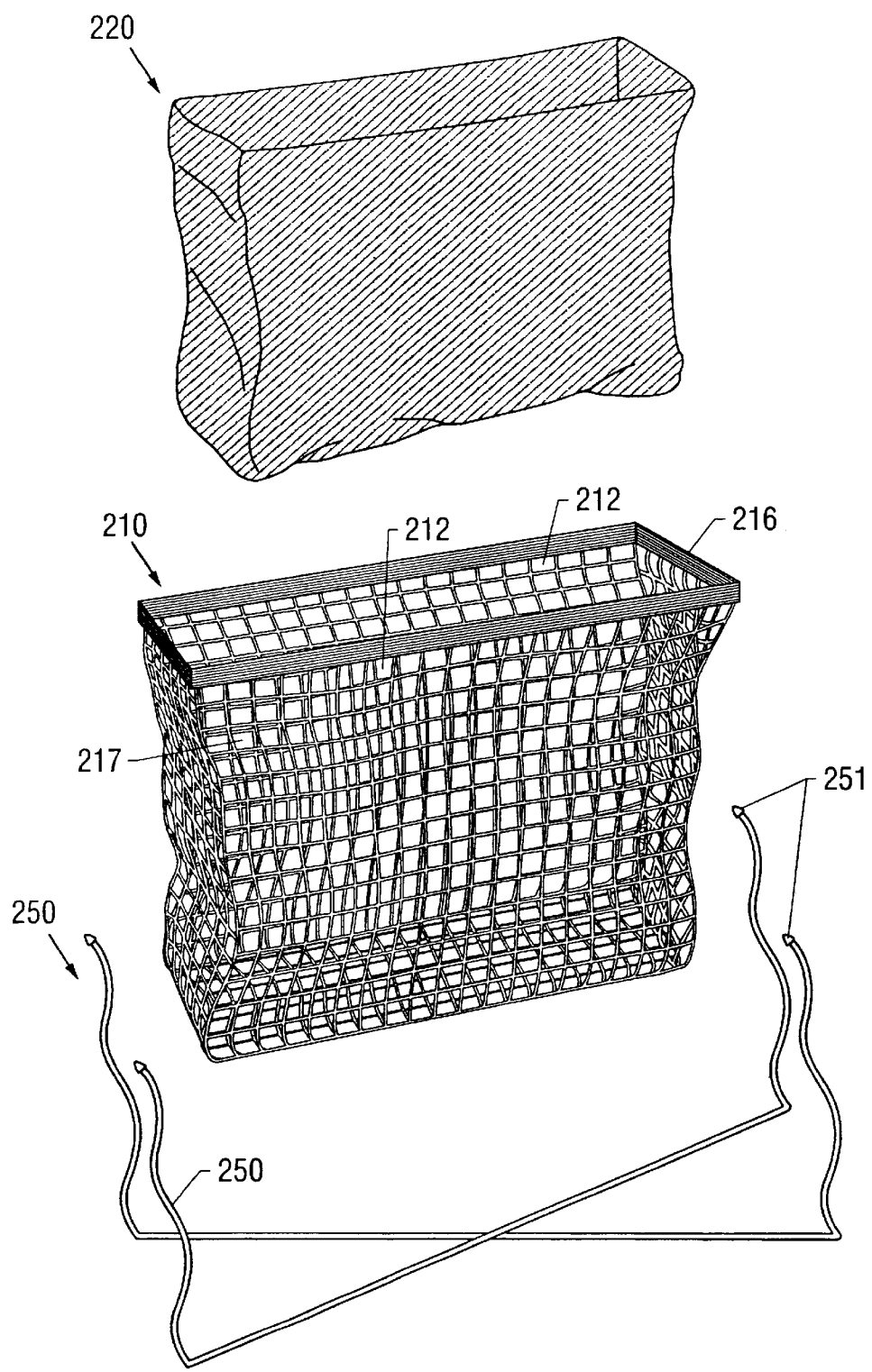
FIG. 30 is an exploded view of the support cables, support basket and filter body used by the embodiment illustrated in FIG. 26.

As indicated, the frame can serve as at least one portion of the filter body support. Referring to FIG. 30, a support basket 210 comprising another portion of the filter body support is illustrated in an exploded view with respect to filter body 220 and support cables 250. Support basket 210 is preferably constructed and positioned such that any fluid passing through filter body 220 must then pass through the support basket. Support basket 210 is also preferably constructed and positioned with respect to filter body 220 such that the support basket passes fluid at a rate equal to or greater than the rate at which the filter body passes fluid. In this manner, the rate of fluid passage through the filter body will then be the more predominant factor in determining the rate at which the reservoir fills with fluid. Accordingly, support basket 210 should contain a plurality of large holes or openings 212 such that fluid flow is not restricted through the support basket.

Support basket 210 is preferably constructed of a material having sufficient strength to support the load imposed by a reservoir filled with fluid, and is preferably constructed from a relatively large holed netting or geogrid, as illustrated in FIG. 30. Such netting or geogrid may be made of, for example, cloth, plastic, metal, wire mesh, or any other sufficiently strong material. In a particularly preferred embodiment, support basket 210 is made from a nylon geogrid manufactured under the designation "Tensor BX-1100" by Earth Technologies, Inc. of Atlanta, Ga. Support basket 210 as depicted in FIG. 30 is generally rectangular or box-shaped, although any other shape generally defining a reservoir is also contemplated. Support basket 210 may be prefabricated into its reservoir defining shape, or the walls and floor of the reservoir may be individually formed and then fastened together via stitching, clamps, ties, tabs, ribs, rails, or the like.

Figure 31:
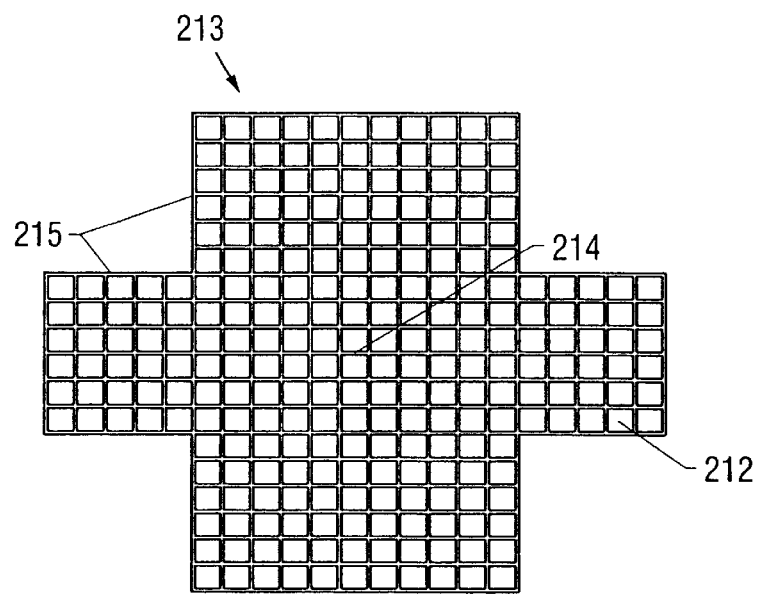
FIG. 31 is a top view of a preferred pattern used to form both the support basket and the filter body of the present invention.

In an especially preferred embodiment, support basket 210 is formed by first cutting or otherwise separating the geogrid or basket material in a cross shape 213, as illustrated in FIG. 31. The center section 214 of the cross defines the support basket floor, while each adjoining section 215 defines a respective wall of the support basket. All adjoining sections 215 are bent, folded or otherwise pulled upward to form the four walled box-shaped support basket as depicted in FIGS. 26 and 30. The integrated wall to floor intersections of this embodiment are advantageously stronger than if each section were made separately and then connected. Adjoining sections 215, which form the basket walls, are then fastened to one another as described above. In a preferred method of fastening adjoining sections 215, support cables 250 are positioned in the corners of the support basket and are woven in and out of the large openings 212 in the adjoining sections, in order to join these sections together to form the support basket.

Referring to FIG. 30, a relatively closed fringe or cuff 216 defines the upper edge of support basket 210 around its open perimeter. Although the direct attachment of lower netting or mesh portion 217 of support basket 210 to the support frame is contemplated, cuff 216 serves to facilitate and strengthen this attachment. It is thus preferable that cuff 216 comprise more material than is typically found in the lower netting or mesh portion 217 of support basket 210. In fact, because cuff 216 rests flush against the lower wall of the support frame when fastened to the support frame, as shown in FIG. 26, it is not necessary for cuff 216 to contain large holes or a net like structure as in lower netting 217. Cuff 216 may be integrally formed with the rest of support basket 210, or alternatively may comprise a separate strip of material that is then fastened to the netting or geogrid material to form the support basket. In one such embodiment, cuff 216 may comprise a length of woven nylon or other suitably strong material that is folded over the upper edge of lower netting 217 and is then glued, melted welded, stapled, or otherwise attached to the lower netting by any suitable means. Bolts may then be used to attach cuff 216 to the lower wall of the support frame, although any other suitable attachment means will suffice. Cuff 216 may also advantageously contain holes to accommodate bolts or other attachment means for attaching support basket 210 to support frame 230.

In a particularly preferred embodiment, as illustrated by the exploded view of FIG. 29, lower netting or mesh portion 217 is clamped between inner support ring 232 and the lower walls 236 of the support flanges 231 and closure flanges 233. Bolts 211 or other equivalent attachment means then pass through inner support ring 232 and lower walls 236, as well as through a plurality of the large openings 212 inherent in the lower netting or mesh portion 217. Appropriate tightening of bolts 211 and the accompanying nuts and washers then provides force sufficient to clamp the netting between the lower walls of the frame segments and the inner support ring, such that the support basket is held in place during the operation of the filtration system. Positioning the bolts or other fastening means through the netting that is clamped between the foregoing elements provides additional support to the netting and support basket as well. As indicated, both frame 230 and support basket 210 are relatively permanent elements of the filtration system such that any other permanent means of attaching these two elements to each other would also be appropriate. Depending on the actual materials of construction for either element, such attachment means may include welds, rivets, screws, glue, snaps, clamps, staples, stitching or the like.

As indicated, the support frame and support basket both serve as portions of the filter body support. Referring again to FIG. 30, support cables 250 comprising another portion of the filter body support are illustrated. Support cables 250 may be formed from any suitably strong material such as, for example, a composite metal wire with a protective plastic coating. A nylon strap or other suitable device may also be used to function as support cable 250. Because support basket 210 is made of a relatively soft geogrid, netting or mesh type of material, the walls of the support basket tend to expand or bulge outward as the reservoir created by the support basket and filter body fills with fluid. As indicated, the excessive load imposed by the increased volumes of high capacity catch basin filtration systems can result in the expansion of the fluid retaining reservoir, which in turn may result in partially or wholly blocked fluid drainage routes, thereby causing a backed up system and drain inlet. Accordingly, support cables 250 are provided to assist in substantially reducing reservoir expansion under increased loads, such that the overall shape of the reservoir is substantially maintained.

Support cables 250 are positioned generally outside support basket 210 and traverse the walls and bottom of the support basket, preferably along the corners between basket walls and across the bottom in a crossing pattern. These support cables function in part to transfer load from the bottom to the corners and/or sides of the filter body. Each support cable 250 is preferably attached to the inner support ring such that the distal ends 251 of each support cable attach at diagonally opposite inner support ring corners. As illustrated in FIG. 30, this results in an X pattern across the bottom of a four-walled box-shaped support basket, with preferably two cables crossing each other diagonally across the bottom. For circular support baskets or those with additional walls, additional support cables may be added such that these support cables then cross each other in a star, asterisk or other pattern across the bottom of the support basket. Although crossing the support cables across the bottom of the basket is believed to provide maximum support, running the support cables in a pattern such that they do not cross each other may also provide advantageous support. As discussed above, it is especially preferable that the support cables be positioned at the intersections of support basket wall segments, in order to perform the additional function of connecting these wall segments by weaving in and out of the openings in each.

Figure 32:
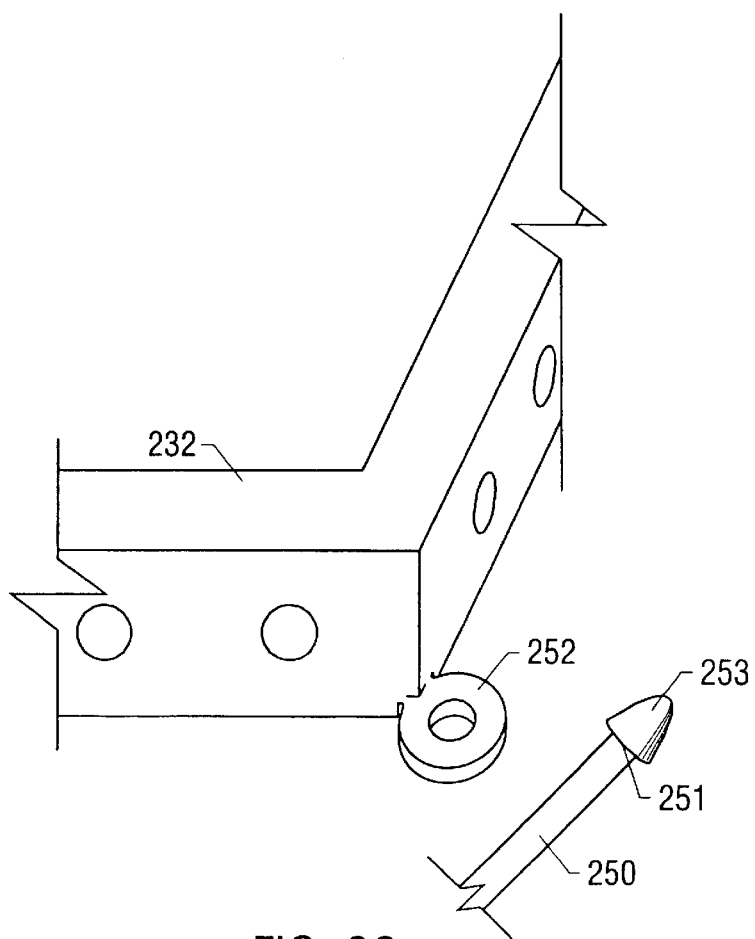
FIG. 32 is a perspective view illustrating one embodiment for attaching a support cable to the frame structure.

The distal ends 251 of the support cables may be attached at the inner support ring, or alternatively the lower frame wall, via any appropriate attachment means, such as welds, rivets, screws, glue, snaps, clamps, staples, stitching or the like. A particularly preferred attachment means is illustrated in FIG. 32. An integrally formed metal loop 252 extends from an outer corner of inner support ring 232 and is adapted to receive a distal end 251 of support cable 250. The support cable is threaded through loop 252 and a hardened tip 253 is then clamped or welded onto distal end 251 such that the end cannot slip back through loop 252. Alternatively, distal end 251 may comprise any type of formation or fitting (not shown) that permits threading in one direction through a loop or opening, but not back in the other direction once threaded.

Figure 33:
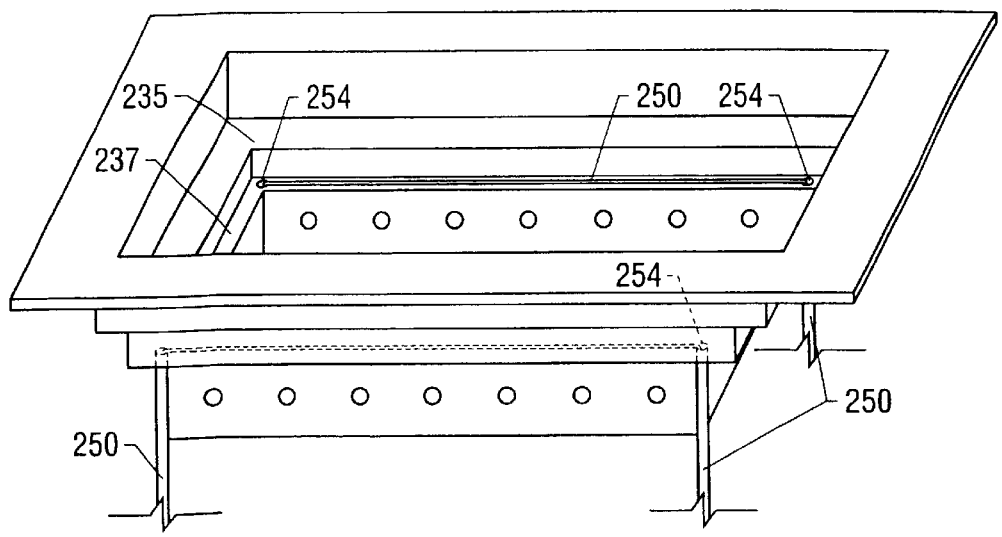
FIG. 33 is a perspective view illustrating an alternative method of attaching a support cable to the frame structure.

In another embodiment, it is contemplated that one or more support cables 250 pass through one or more optional holes or openings 254 in a support surface 235 or other surface 237 of support frame 230, as illustrated in FIG. 33. After rising through one such optional hole 254, portions of cable 250 may then run along and above support surface 235 or other surface 237 before dropping back down though another optional hole 254. Under this embodiment, it would thus be possible to utilize one elongated cable that runs along many or all wall-to-wall corners, crosses itself at the bottom of the support basket and traverses portions of the upper side of a frame support surface. Preferably, the distal ends of such an elongated cable would then meet once the cable has traversed the desired number of wall-to-wall corners, such that the ends may attach to each other or to the frame or other stable attachment source at a specific location.

Referring again to FIG. 30, filter body 220 is illustrated as a generally rectangular or box-shaped reservoir. As indicated in the foregoing embodiments, a variety of terms can be used to describe the general fluid retaining shape of filter body 220, such as trough, pocket, basket, catch basin, reservoir and the like. This filter body is substantially similar in nature to the filter body described in the foregoing embodiments in several respects. One purpose of the filter body is to capture and substantially retain sediment, debris and other material carried by storm runoff or other fluid, while permitting the fluid itself to pass through. Accordingly, at least a portion of the filter body is constructed of perforated or porous materials. In a preferred embodiment, the entire filter body 220 is comprised of such porous material in order to maximize the capacity of filtered flow through the filtration system. As in the foregoing embodiments, the perforated or porous material may be constructed of screen, netting, woven cloth, or other appropriate filtering materials that are strong enough to withstand the load imposed by accumulated sediment, debris, and/or a filled catch basin reservoir. A particularly preferred material for constructing the filter body is a woven geotextile material made of monofilament polypropylene yarns such as Mirafi Filterweave® 401 manufactured by TC Mirafi of Pendergrass, Ga. The size of the perforations or openings in the filter body material may vary as desired to meet varied demands for filtered fluid flow capacity and retention of particular particle sizes.

As indicated, the entire filter body may be constructed of perforated or porous material, or alternatively constructed of a combination of porous and non-porous materials depending on a particular application, such as a desire for controlled or no fluid flow from specific filter body locations. The entire filter body will typically be made from porous material, and may be fabricated as a complete unit or may be formed by combining and fastening together several walls and a floor from the same or various materials as needed. In one embodiment a sufficient amount of porous or filtering material is formed into four walls and a floor, which are then fastened to each other at corners such that a filter body comprising a box-shaped reservoir is created, as illustrated in FIG. 30. Alternatively, as illustrated in FIG. 31, a similar method of cutting or otherwise separating the filter body material into a cross shape 213 may be used. Analogously to the method used in forming the support basket, the center section 214 of the cross defines the filter body floor, while each adjoining section 215 defines a respective wall of the filter body. All adjoining sections 215 are bent, folded or otherwise pulled upward to form the four walled box-shaped filter body reservoir, as depicted in FIGS. 26 and 30. Under any piece connecting alternative, the pieces of filtering material are preferably tightly stitched or sewn together to minimize the amount of fluid that might pass through the mating of the individual pieces. Other suitable means for connecting the individual pieces may also be used including, for example, buttons, rivets, tabs, snaps, loops, velcro, glue, clamps and the like.

Figure 34:
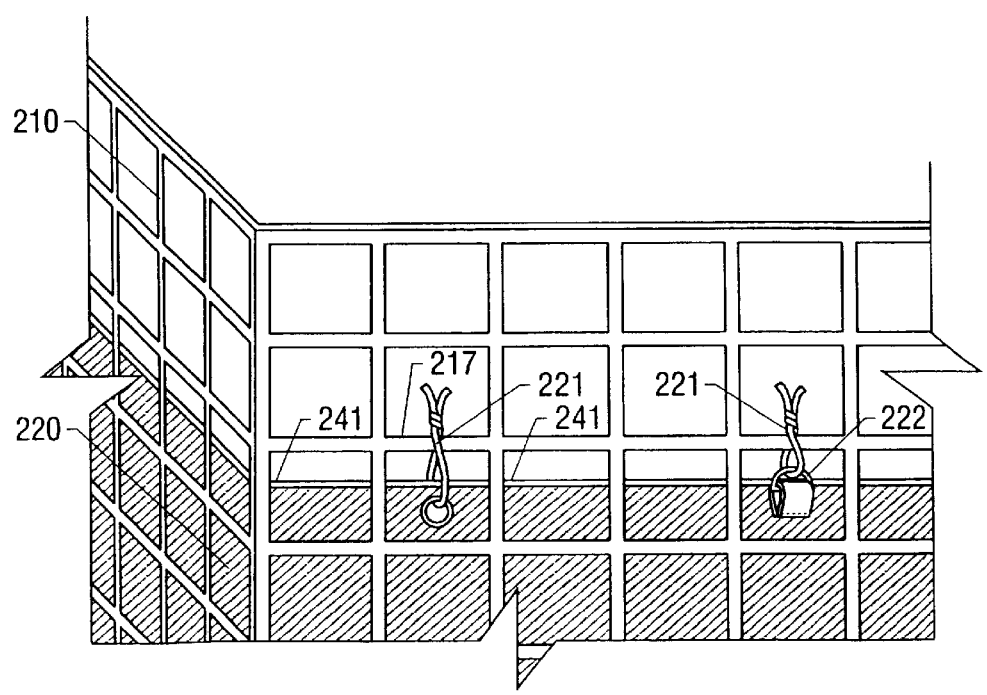
FIG. 34 is a partial perspective view illustrating the tabs connecting the filter body to the support basket.

As illustrated in FIGS. 26 and 30, filter body 220 generally lines the walls and floor of support basket 210 such that the filter body substantially takes the shape of the support basket. This is especially true as the filtration system and reservoir begin to fill with fluid. Referring to FIG. 34, appropriate connection means are used to attach the filter body to the support basket. Any suitable means for connecting the walls of the filter body to the walls of the support basket may be used, including tabs, snaps, button, rivets, loops, clamps, staples, and the like. In one embodiment, a plurality of connecting tabs 221 pass through small holes around the upper edge 241 of filter body 220 and close around the filter body and sections of the lower netting or mesh portion 217 of support basket 210. In a particularly preferred embodiment, the small holes around the upper edge of the filter body are forgone in favor of "D-rings" 222, which comprise hoops made of plastic or other similar material. D-rings 222 are preferably connected to small nylon straps or loops, which are sewn onto the walls of the filter body near upper edge 241, and are preferably located on the outer wall of the filter body. Connecting tabs 221 then pass through D-rings 222 and close around a section of the geogrid or lower netting 217 to connect filter body 220 to support basket 210.

The filter body generally fits within, is supported by, and takes the shape of the support basket, such that the floor of the support basket provides a substantial amount of the support required by the filter body. Accordingly, connecting tabs 221 or other appropriate connection means do not necessarily need to support the bulk of the vertical load imposed by a filled filter body. A primary purpose of the connecting tabs or other appropriate connection means then is to ensure that the filter body remains against the walls of the support basket and does not, for example, inappropriately cave inward toward the center of the reservoir.

Figure 35:
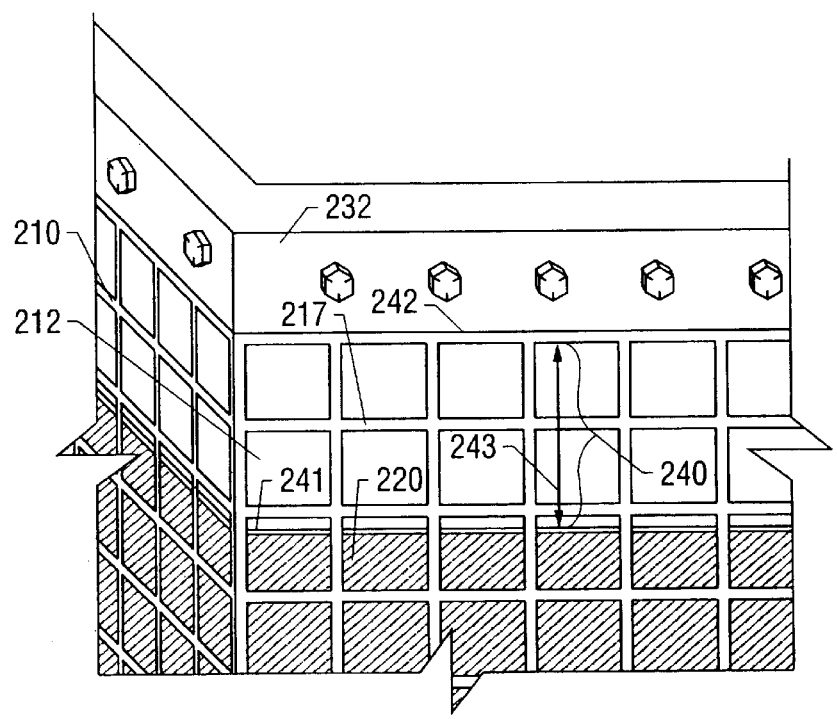
FIG. 35 is a partial side perspective view of the high flow bypass formed by the spaced distance between the frame structure and filter body.

As indicated, it is highly desirable for any catch basin filtration system to have a high flow bypass feature so that storm water runoff may pass through the drainage system and not back up and flood the surrounding areas during heavy storms or other periods of high fluid flow. Referring to FIG. 35, a readily adjustable high flow bypass of the preferred embodiment is illustrated in detail. Upper edge 241 of filter body 220 is spaced some distance below bottom edge 242 of inner support ring 232 (or lower frame wall 236 in the absence of an inner support ring), exposing some of the large openings 212 of lower netting 217 of support basket 210. This spaced distance 243 where the netting of the support basket is not lined or covered by the filter body substantially serves to define high flow bypass 240 through the support basket. Spaced distance 243 is preferably identical around the circumference of support basket 210, although customization of the high flow bypass in order to advantageously direct or block bypass flow in certain directions is contemplated. As the filter body fills with fluid, all porous walls and/or floor of the filter body will pass fluid at a particular combined rate. Should fluid flow be so high that the filter body fills with fluid faster than this combined rate at which fluid is able to pass through the filter body, excess fluid will eventually spill over the upper edge 241 of filter body 220. This excess fluid then readily passes through the relatively large and exposed openings 212 in lower netting 217 between upper edge 241 and lower edge 242 within the spaced distance 243 comprising high flow bypass 240.

Under extreme flow conditions, it is possible that a high flow bypass 240 created by the spaced distance 243 between edges 241 and 242 will be inadequate. Extreme flows may require a greater surface area of exposed lower netting 217 in order to pass the required amount of fluid without generating a system backup that may result in local flooding. As seen in FIG. 35, spaced distance 243 is adjustable such that catch basin filtration systems that may be exposed to extreme flow conditions can accommodate such a flow. Spaced distance 243 is adjusted by raising or lowering upper edge 241 of filter body 220 with respect to support basket 210, whereby the capacity of the high flow bypass is then altered. As should be readily apparent, any increase in the capacity of the high flow bypass will decrease the capacity of filtered flow, while a decrease in the high flow bypass capacity will conversely increase the filtered flow capacity.

Figure 36:
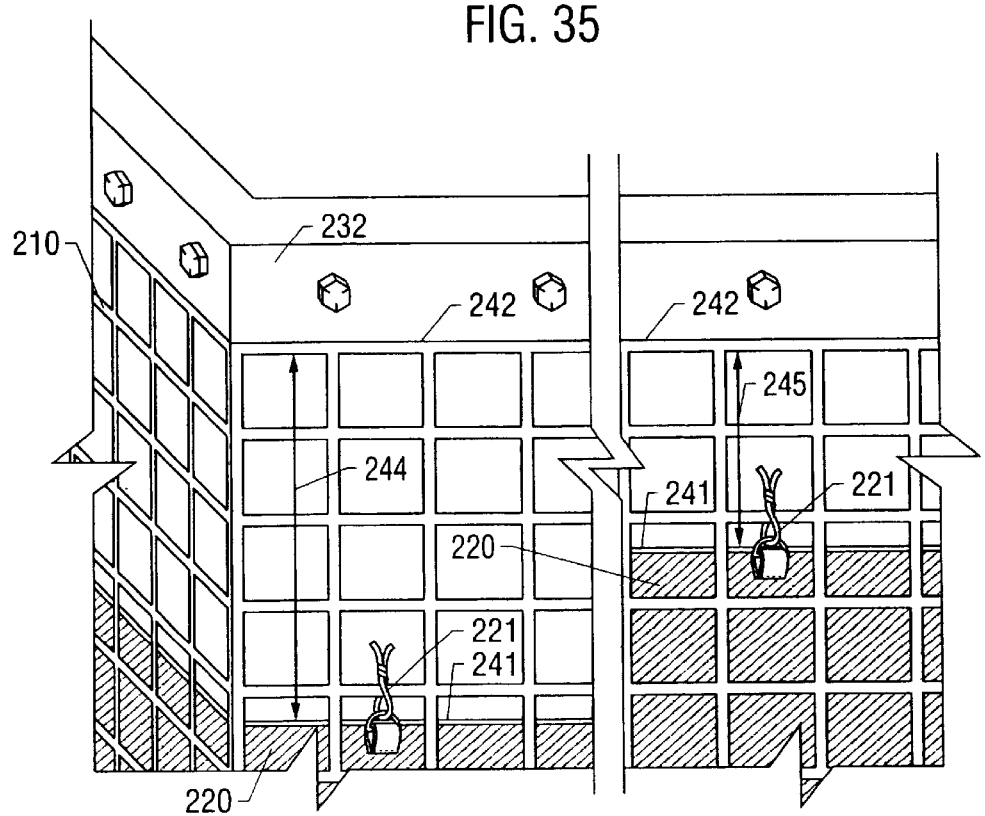
FIG. 36 is another partial side view illustrating various settings for the adjustable high flow bypass.

As illustrated in FIG. 36, upper edge 241 may be lowered to create a large spaced distance 244 if extreme or excessively high flows are anticipated or need to be averted at all costs. Conversely, upper edge 241 may be raised to create a standard or shortened spaced distance 245 if extreme flows are not a local issue and maximum filtered flow is desired at the expense of high flow bypass capacity. Similar connection means may be used to connect the filter body to the support basket, for example connecting tabs 221, regardless of the level at which the upper edge of the filter body attaches to the support basket. A high, low or standard initial level for upper edge 241 with respect to lower edge 242 can be set, and this level may then be readily altered in order to adjust the high flow bypass as necessary. If adjustment is desired, connecting tabs 221 are preferably cut off and discarded, and new ones are then used to reattach the filter body at a new position on the support basket.

Figure 37:
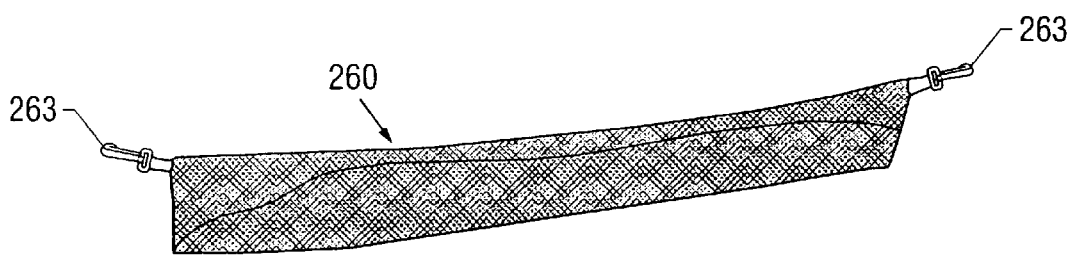
FIG. 37 is a perspective view of a removably suspendable adsorbent boom.

Referring to FIG. 37, a single adsorbent boom 260 is illustrated. Boom 260 preferably resides within filter body 220 and comprises an adsorbent container that is substantially similar to container 27 as described in a foregoing embodiment. As indicated, it is desirable that adsorbent containers such as boom 260 or container 27 float or become otherwise displaced when the filter body fills with fluid. Silt, sediment and debris tend to settle and build up on the floor of the filter body or on any other static surface within the filter body or reservoir. Adsorbent containers that remain static and in place tend to accumulate silt and sediment rather quickly, such that these containers then lose their effectiveness as a filtering agent and must be maintained more often.

Boom 260 is advantageously removably attached to and suspended from one or more inner walls of filter body 220 by clips 263 or other appropriate attachment means. In a particularly preferred embodiment, loops or "D-rings" identical or similar to those used to connect the filter body to the support basket are used. These D-rings are preferably sewn onto the inner walls of the filter body at an anchoring location between the filter body floor and upper edge. This anchoring location preferably occurs at a wall to wall corner of the filter body, and preferably allows boom 260 to rest against the floor and/or one or more walls of the filter body during periods of little or no flow. In addition, this anchoring location is ideally positioned such that boom 260 will float at or near the fluid surface as the filter body fills with fluid, but such that boom 260 can never rise above upper edge 241, so as not to impede the high flow bypass during periods of high flow. Alternatively, boom 260 will at least rise or depart some distance from the floor and/or walls of the filter body even if not at the fluid surface.

As the boom floats or otherwise moves away from the floor and/or walls of the filter body, silt and sediment pass by and settle at the bottom of the filter body. In addition, the movement of the boom as it floats or otherwise moves or shifts facilitates the rinsing away of any silt buildup that may have accumulated on the boom during periods of light flow. In this manner, silt and sediment accumulate on the floor of the filter body rather than on the boom, such that the boom remains an effective filtering agent for a longer period of time. Boom 260 is preferably clipped into place via clips 263 at each end of the boom, which attach to D-rings attached to nylon loops sewn onto the filter body walls, or attached by other appropriate means such that it is readily removable for purposes of system maintenance. Boom 260 is readily removed from the filtration system during maintenance, and is then either discarded or cleaned for further use.

Figure 38:
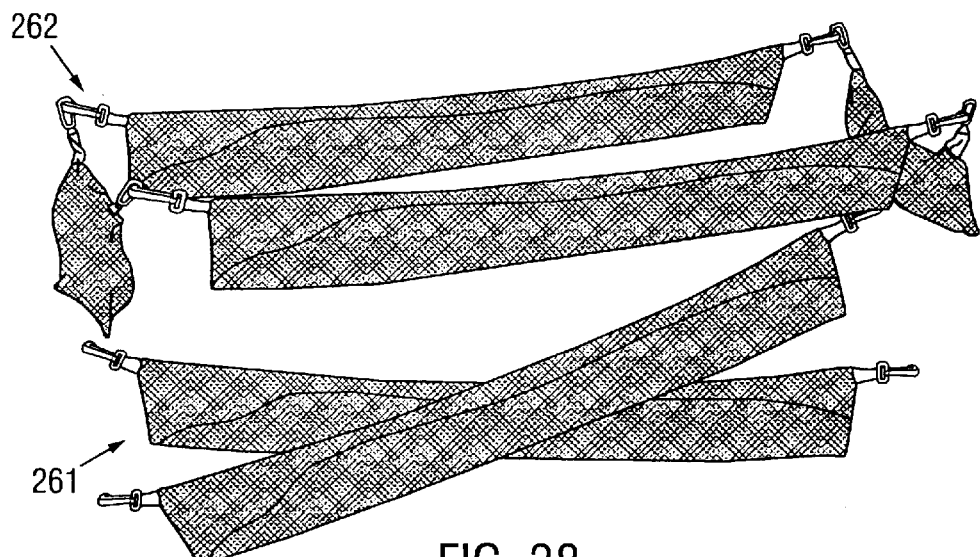
FIG. 38 is a perspective view of two separate configurations comprising multiple adsorbent booms of FIG. 37.

Booms can be very effective in providing additional filtration of oils and other chemical compounds, and are preferably installed in strategic configurations in order to maximize their exposure to storm runoff or other processed fluid. Examples of two such configurations are illustrated in FIG. 38. First configuration 261 comprises a pair of booms in an X formation. This pair of booms preferably rests at the floor of the filter body such that a substantial amount of passing fluid will be exposed to either or both booms before passing through the filter body floor. Both booms are clipped at each end to D-rings attached at diagonally opposed wall-to-wall corners of the filter body such that these booms are effectively suspended within the filter body while also being at rest on the filter body floor. As indicated, these suspended booms will rise or float as the filter body fills with fluid, such that silt and sedimentation wash off and do not accumulate on these booms.

Second configuration 262 comprises one boom situated along each wall of the filter body. For this particular filter body this results in 4 booms, which are suspendably clipped at each end to adjacent wall-to-wall corners such that each boom rests against a filter body wall. Each boom may also rest against the filter body floor and, as in the configuration above, each suspended boom will rise or float as the filter body fills with fluid. While configuration 261 tends to expose its booms to fluid before the fluid passes through the filter body floor, configuration 262 is designed such that fluid becomes exposed to its booms before the fluid passes through the walls of the filter body. Although not all fluid passing through the filtration system will become exposed to one or more booms in this manner, the oils and chemicals that these booms primarily target tend to float. These configurations of booms then have been found to be extremely effective in removing the bulk of oils and chemicals from storm runoff or other fluid flows. Other configurations of booms are also contemplated, and other such configurations that may be advantageous should be readily apparent to one skilled in the art.

As indicated, it is also desirable to retain large objects or other floatable types of debris, for example cigarette butts, while the high flow bypass is in use. By definition, a high flow bypass permits excess fluid to pass through the system without being filtered during periods of high flow. Although this outcome is generally acceptable when compared to the alternative of backed up drain inlets, many filtration systems are unable to effectively restrain even large objects when their high flow bypass is in use.

Figure 39:
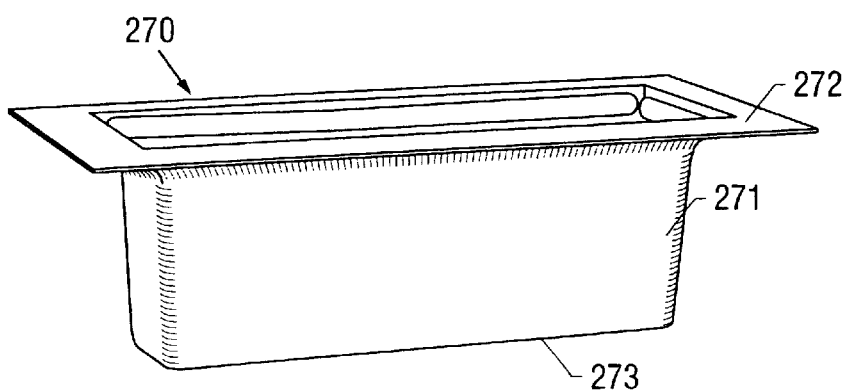
FIG. 39 is a perspective view of a removable debris trap.

Referring to FIG. 39, a removable debris trap capable of restraining large objects and other floatables is illustrated. Removable debris trap 270 is constructed such that it can withstand the banging and poking that may result from large objects entering the drain inlet, for example garbage or small tree branches. This debris trap is thus preferably fabricated from steel, hard plastic, fiberglass, or a wide variety of suitably rigid materials. Debris trap 270 comprises walls 271 that extend substantially into the reservoir of the filtration system. Walls 271 preferably extend to a depth beyond the lowest possible or practical fluid level for a large high flow bypass setting. Since the primary function of the debris trap is to restrain large objects and floatables, it is preferable that the water level of the system be above lower edge 273 of the debris trap whenever the high flow bypass is in use. Particularly deep walls are not necessary, such that the wall length of the debris trap may vary in order to account for especially high or especially low capacity settings for the high capacity bypass.

Outer flange 272 of debris trap 270 is adapted to rest atop an inner support surface of the frame with little or no attachment means, such that the debris trap is readily removable for, among other reasons, improved accessibility of the rest of the system during maintenance. Minimal attachment means such as snaps or velcro may be used, if desired. Typically, a drain inlet grate will rest on top or just above the debris trap such that the debris trap is generally held or kept in place. In addition, because debris trap 270 generally rests loosely atop the inner support surface, the debris trap is displaceable and can rise as sediment and debris build up within the filter body. Should excessive amounts of sediment or debris accumulate within the filter body within a short period of time or, alternatively, should the filtration system not be maintained for a sustained period, built up sediment and debris will eventually push up against the lower edge 273 of debris trap 270. This feature prevents the filtration system from causing backups and flooding should inordinate amounts of silt and sedimentation build up and block most or all of the filter body from filtering fluid.

As periods of high fluid flow come and go, it becomes possible for large objects and floatables to go below the lower edge of 273 of the debris trap as the water level recedes, and then rise again outside the debris trap walls 271 during future periods of high flow. Additional means may be used to redirect fluid flows such that these large objects and floatables do not tend to pass through the large netting holes comprising the high flow bypass at a later period of high flow.

Figure 40:
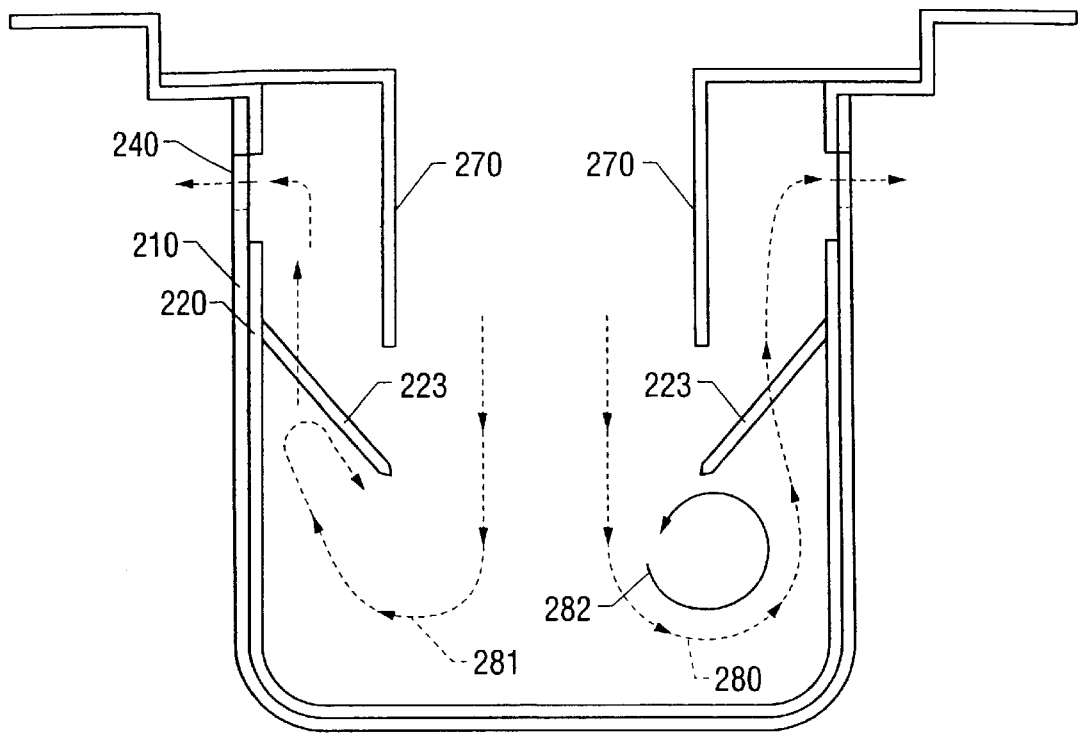
FIG. 40 is a side cross-sectional view of an assembled and operational preferred embodiment of the present invention.

Referring to FIG. 40, a cross-sectional view of an entire filtration system according to a preferred embodiment is illustrated. One or more baffles 223 are created in the filter body at strategic locations such that fluid flow is redirected away from the walls of the filter body at these locations. In a particularly preferred embodiment, one baffle is positioned part way up the interior wall of the filter body and extends completely around all inner walls of the filter body. This baffle can be continuous or can also be in segments that may or may not be connected to each other at the ends. Baffle 223 preferably angles downward from the filter body wall such that it generally redirects flows climbing the filter body wall back toward the center of the support basket floor. The general flow pattern 280 of this system has incoming fluid passing down and through the debris trap toward the floor of the filter body, then away toward the walls of the filter body and up the filter body walls toward the high flow bypass. With baffle 223 in place, the redirected flow 281 is forced away from the filter body wall, around the baffle, back toward the filter body wall, and then up toward and out the high flow bypass. While the passing fluid is generally capable of traversing this route, large objects and floatables are usually unable to do so. Such debris typically flows in a generally circular pattern 282 below the baffle level rather than traversing and rising up and over the baffle.

Figure 41:
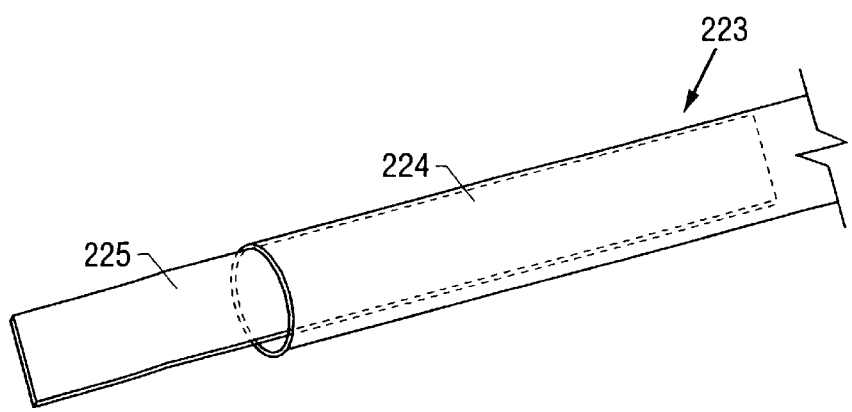
FIG. 41 is a partial perspective view of a baffle and filter body wall combination.

Referring to FIG. 41, the baffle or baffle sleeve 224 may be formed in a variety of ways, as may be readily appreciated. In one embodiment, baffle 223 is made from a baffle sleeve 224 comprising the same or similar material of the filter body, which is then sewn onto the filter body wall. In a particularly preferred embodiment, baffle sleeve 224 is formed by folding the filter body wall onto itself during the construction of the filter body. Stitches, staples or other appropriate means may then be used to keep baffle sleeve 224 in place. A long piece of plastic or other stiffener 225 is preferably inserted into baffle sleeve 224 in order to create a baffle with an appropriate level of positioning stiffness. Baffle 223 preferably extends around the entire circumference of an inner wall of the filter body, and is typically broken into segments such that one segment attaches to each wall of the filter body. As with the walls of the filter body, these baffle segments are attached at the corners via stitching, staples, or other appropriate attachment means. An added benefit is that baffle 223 provides additional stiffness to the filter body in general, such that the filter body is better able to retain its shape even during periods of low or no fluid flow.

Numerous other variations and embodiments can be discerned from the above-detailed description of the invention and illustrations thereof. All such variations are encompassed within the scope and spirit of the present invention.

What is claimed is:

1. An apparatus, comprising:
   (a) a filter body dimensioned to fit within an inlet and forming a reservoir obstructing at least a portion of said inlet;
   (b) a filter body support dimensioned and adapted to cooperatively engage with said inlet and with said filter body to substantially maintain said filter body in a pre-selected position within said inlet;
   (c) one or more connectors removably connecting said filter body to said filter body support; and
   (d) an adjustable high flow bypass situated within said filter body support and capable of passing excess fluid during periods of high volume fluid flow, wherein the fluid flow capacity of said bypass is altered by adjusting the position of said filter body with respect to said filter body support.

2. The apparatus of claim 1 wherein said filter body support comprises a support basket capable of containing said filter body.

3. The apparatus of claim 2 wherein said support basket comprises a netting having a plurality of openings throughout.

4. The apparatus of claim 3 wherein said bypass is formed above said filter body and around and through a perimeter of said support basket.

5. The apparatus of claim 4 whereby the fluid flow capacity of said bypass is increased by lowering said filter body within said support basket.

6. An apparatus, comprising:
   (a) a filter body dimensioned to fit within an inlet and forming a reservoir obstructing at least a portion of said inlet;
   (b) a filter body support dimensioned and adapted to cooperatively engage with said inlet and with said filter body to substantially maintain said filter body in a pre-selected position within said inlet;
   (c) one or more connectors removably connecting said filter body to said filter body support;
   (d) an adjustable high flow bypass situated within said filter body support and capable of passing excess fluid during periods of high volume fluid flow; and
   (e) one or more adsorbent containers within said filter body, wherein said one or more adsorbent containers comprise pouches filled with amorphous siliceous material.

7. The apparatus of claim 6 wherein said pouches comprise elongated booms removably attached to the inner walls of said filter body.

8. An apparatus, comprising:
   (a) a filter body dimensioned to fit within an inlet and forming a reservoir obstructing at least a portion of said inlet;
   (b) a filter body support dimensioned and adapted to cooperatively engage with said inlet and with said filter body to substantially maintain said filter body in a pre-selected position within said inlet;
   (c) one or more connectors removably connecting said filter body to said filter body support;
   (d) an adjustable high flow bypass situated within said filter body support and capable of passing excess fluid during periods of high volume fluid flow; and
   (e) one or more adsorbent containers within said filter body, wherein said one or more adsorbent containers are attached to and are capable of resting against one or more inner walls of said filter body.

9. An apparatus, comprising:
   (a) a filter body dimensioned to fit within an inlet and forming a reservoir obstructing at least a portion of said inlet;
   (b) a filter body support dimensioned and adapted to cooperatively engage with said inlet and with said filter body to substantially maintain said filter body in a pre-selected position within said inlet;
   (c) one or more connectors removably connecting said filter body to said filter body support;
   (d) an adjustable high flow bypass situated within said filter body support and capable of passing excess fluid during periods of high volume fluid flow; and
   (e) one or more adsorbent containers within said filter body, wherein at least some of said one or more adsorbent containers form an X-shape across the bottom of said filter body.

10. An apparatus, comprising:
(a) a filter body dimensioned to fit within an inlet and forming a reservoir obstructing at least a portion of said inlet;
(b) a filter body support dimensioned and adapted to cooperatively engage with said inlet and with said filter body to substantially maintain said filter body in a pre-selected position within said inlet;
(c) one or more connectors removably connecting said filter body to said filter body support, wherein said connectors comprise snap couplings attached both to said filter body and to said filter body support; and
(d) an adjustable high flow bypass situated within said filter body support and capable of passing excess fluid during periods of high volume fluid flow.

11. An apparatus, comprising:
(a) a filter body dimensioned to fit within an inlet and forming a reservoir obstructing at least a portion of said inlet;
(b) a filter body support dimensioned and adapted to cooperatively engage with said inlet and with said filter body to substantially maintain said filter body in a pre-selected position within said inlet;
(c) one or more connectors removably connecting said filter body to said filter body support; and
(d) a shape-retaining baffle connected to said filter body and capable of redirecting at least a portion of a fluid flow through said filter body, wherein said baffle comprises a stiffening member sewn into an inner wall of said filter body.

12. The apparatus of claim 11 wherein said baffle extends around the inner walls of said filter body.

13. An apparatus, comprising:
(a) a filter body dimensioned to fit within an inlet and forming a reservoir obstructing at least a portion of said inlet;
(b) a filter body support dimensioned and adapted to cooperatively engage with said inlet and with said filter body to substantially maintain said filter body in a pre-selected position within said inlet, said filter body support comprising one or more cables and a support basket, said cables positioned along a plurality of wall-to-wall corners of said basket and traversing the bottom of said basket in a crossing formation; and
(c) one or more connectors removably connecting said filter body to said filter body support.

14. The apparatus of claim 13 wherein said support basket is substantially box-shaped, and said cables are positioned along all four wall-to-wall corners and form an X-shape across the bottom of said basket.

15. An apparatus, comprising:
(a) a filter body dimensioned to fit within an inlet and forming a reservoir obstructing at least a portion of said inlet;
(b) a filter body support dimensioned and adapted to cooperatively engage with said inlet and with said filter body to substantially maintain said filter body in a pre-selected position within said inlet, said filter body support comprising one or more cables and a support basket, said cables positioned along a plurality of wall to-wall corners of said basket and traversing the bottom of said basket in a non-crossing formation; and
(c) one or more connectors removably connecting said filter body to said filter body support.

16. An apparatus, comprising:
(a) a means for filtering fluid, said filtering means being dimensioned to fit within an inlet and forming a reservoir obstructing at least a portion of said inlet;
(b) a means for supporting said filtering means, said supporting means being dimensioned and adapted to cooperatively engage with said inlet and with said filtering means;
(c) one or more connecting means for removably connecting said filtering means to said supporting means; and
(d) a means for bypassing excess fluid during periods of high volume fluid flow, wherein said bypassing means is adjustable.

17. The apparatus of claim 16, further comprising:
(e) a means for trapping debris, said trapping means being dimensioned and adapted to cooperatively engage with said inlet and said filtering means; and
(f) a means for redirecting fluid flow through said filtering means, said redirecting means being connected to said filtering means.

* * * * *